(12) United States Patent
Bradley

(10) Patent No.: US 7,682,492 B2
(45) Date of Patent: Mar. 23, 2010

(54) ELECTROCOAGULATION SYSTEM

(75) Inventor: Kirk D. Bradley, St. George, UT (US)

(73) Assignee: New Earth Systems, Inc., St. George, UT (US)

( * ) Notice: Subject to any disclaimer, the term of this patent is extended or adjusted under 35 U.S.C. 154(b) by 1059 days.

(21) Appl. No.: 10/817,743

(22) Filed: Apr. 2, 2004

(65) Prior Publication Data
US 2004/0251213 A1 Dec. 16, 2004

Related U.S. Application Data

(60) Provisional application No. 60/460,774, filed on Apr. 2, 2003, provisional application No. 60/460,441, filed on Apr. 4, 2003.

(51) Int. Cl.
*C25B 9/18* (2006.01)

(52) U.S. Cl. ............ 204/230.2; 204/228.1; 204/229.4; 205/676; 210/748

(58) Field of Classification Search ............ 205/676; 210/748; 204/228.1, 229.4, 230.2
See application file for complete search history.

(56) References Cited

U.S. PATENT DOCUMENTS

| | | | |
|---|---|---|---|
| 3,061,537 A | 10/1962 | Yagishita | |
| 3,969,203 A | 7/1976 | Ramirez | |
| 3,969,245 A | 7/1976 | Ramirez | |
| 3,975,269 A | 8/1976 | Ramirez | |
| 3,977,959 A | 8/1976 | Habermann et al. | |
| 4,009,104 A | 2/1977 | Behrendt et al. | |
| 4,036,726 A | 7/1977 | Gale et al. | |
| 4,189,381 A | 2/1980 | Laferty et al. | |
| 4,219,416 A | 8/1980 | Ramirez et al. | |
| 4,219,417 A | 8/1980 | Ramirez | |
| 4,222,872 A | 9/1980 | Ramirez | |
| 4,329,211 A | 5/1982 | Plantes et al. | |
| 4,349,430 A | 9/1982 | Efimov et al. | |
| 4,349,431 A | 9/1982 | Axenko et al. | |
| 4,414,091 A | 11/1983 | Axenko et al. | |
| 4,728,404 A | 3/1988 | Renzler | |
| 4,728,410 A | 3/1988 | Renzler | |
| 4,872,959 A | 10/1989 | Herbst et al. | |
| 4,917,782 A | 4/1990 | Davies | |
| 5,240,572 A * | 8/1993 | Turner et al. | 205/760 |
| 5,302,273 A | 4/1994 | Kemmerer | |
| 5,372,690 A | 12/1994 | Gardner-Clayson et al. | |
| 5,439,577 A * | 8/1995 | Weres et al. | 204/268 |
| 5,531,865 A * | 7/1996 | Cole | 205/751 |

(Continued)

FOREIGN PATENT DOCUMENTS

EP 1 582 506 A1 8/2004

(Continued)

*Primary Examiner*—Harry D Wilkins, III
*Assistant Examiner*—Nicholas A. Smith
(74) *Attorney, Agent, or Firm*—Thorpe North & Western LLP

(57) ABSTRACT

An electrocoagulation device for removal of contaminants from a treatment stream including an elongated fluid treatment path in contact with a plurality of electrode plates, and a power supply electrically connected to the plates, wherein the device is configured so that it can provide a variety of electric field regimes to the treatment stream as it passes along the treatment path, and so that it can provide a variety of flow regimes along the fluid treatment path.

47 Claims, 15 Drawing Sheets

U.S. PATENT DOCUMENTS

| | | | |
|---|---|---|---|
| 5,549,812 A * | 8/1996 | Witt a.k.a. Witte | 205/744 |
| 5,558,755 A | 9/1996 | Gardner-Clayson et al. | |
| 5,597,479 A | 1/1997 | Johnson | |
| 5,611,907 A | 3/1997 | Herbst et al. | |
| 5,616,241 A | 4/1997 | Khudenko | |
| 5,928,493 A | 7/1999 | Morkovsky et al. | |
| 6,015,496 A | 1/2000 | Khudenko | |
| 6,096,179 A * | 8/2000 | Fajt et al. | 204/294 |
| 6,139,710 A | 10/2000 | Powell | |
| 6,179,977 B1 | 1/2001 | Herbst | |
| 6,238,546 B1 | 5/2001 | Knieper et al. | |
| 6,241,861 B1 | 6/2001 | Herbst | |
| 6,294,061 B1 | 9/2001 | Mokovsky et al. | |
| 6,325,916 B1 | 12/2001 | Lambert et al. | |
| 6,346,197 B1 | 2/2002 | Stephenson et al. | |
| 6,358,398 B1 | 3/2002 | Halldorson et al. | |
| 6,488,835 B1 | 12/2002 | Powell | |
| 6,495,048 B2 | 12/2002 | Stephenson et al. | |
| 6,582,592 B2 | 6/2003 | Arnaud | |
| 6,613,202 B2 | 9/2003 | Herbst | |
| 6,613,217 B1 | 9/2003 | Gilmore | |
| 6,663,783 B2 | 12/2003 | Stephenson et al. | |
| 6,669,839 B2 | 12/2003 | Tipton et al. | |
| 6,673,321 B2 | 1/2004 | Weakly et al. | |
| 6,689,271 B2 | 2/2004 | Morkovsky et al. | |
| 6,719,894 B2 | 4/2004 | Gavrel et al. | |
| 6,733,654 B1 | 5/2004 | Itzhak | |
| 6,746,593 B2 | 6/2004 | Herbst | |
| 6,887,368 B2 | 5/2005 | Khalemsky et al. | |
| 6,896,815 B2 | 5/2005 | Cort | |
| 6,902,678 B2 | 6/2005 | Tipton | |
| 6,949,195 B2 | 9/2005 | Morse et al. | |
| 6,960,301 B2 | 11/2005 | Bradley | |
| 6,972,077 B2 | 12/2005 | Tipton et al. | |
| 7,087,176 B2 * | 8/2006 | Gavrel et al. | 210/748 |
| 2001/0004063 A1 | 6/2001 | Oh | |
| 2001/0025784 A1 | 10/2001 | Herbst et al. | |
| 2002/0040855 A1 | 4/2002 | Morkovsky et al. | |
| 2002/0121352 A1 | 9/2002 | Lawson et al. | |
| 2002/0148761 A1 * | 10/2002 | Siriphraiwan | 210/96.1 |
| 2003/0075456 A1 * | 4/2003 | Collins et al. | 206/710 |
| 2004/0069716 A1 | 4/2004 | Morse et al. | |
| 2004/0079650 A1 | 4/2004 | Morkovsky et al. | |
| 2005/0211638 A1 | 9/2005 | Schrive et al. | |
| 2005/0224338 A1 | 10/2005 | Kin et al. | |
| 2005/0230321 A1 | 10/2005 | Berrak et al. | |
| 2005/0247571 A1 | 11/2005 | Grigg | |
| 2005/0258103 A1 | 11/2005 | Cort | |
| 2007/0068826 A1 | 3/2007 | Morkovsky et al. | |

FOREIGN PATENT DOCUMENTS

| | | | |
|---|---|---|---|
| WO | WO 2005/028377 A1 | 3/2005 | |

* cited by examiner

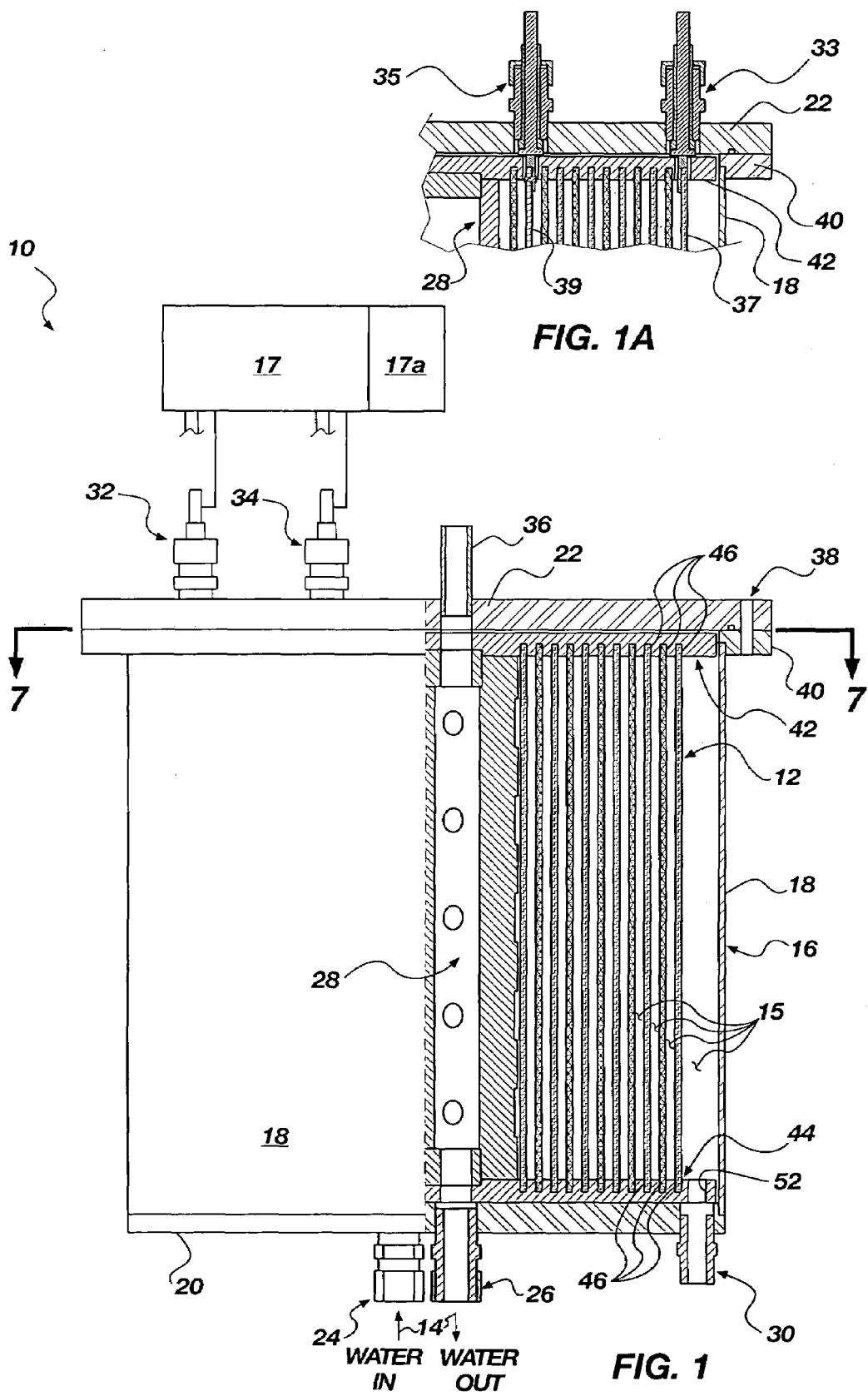

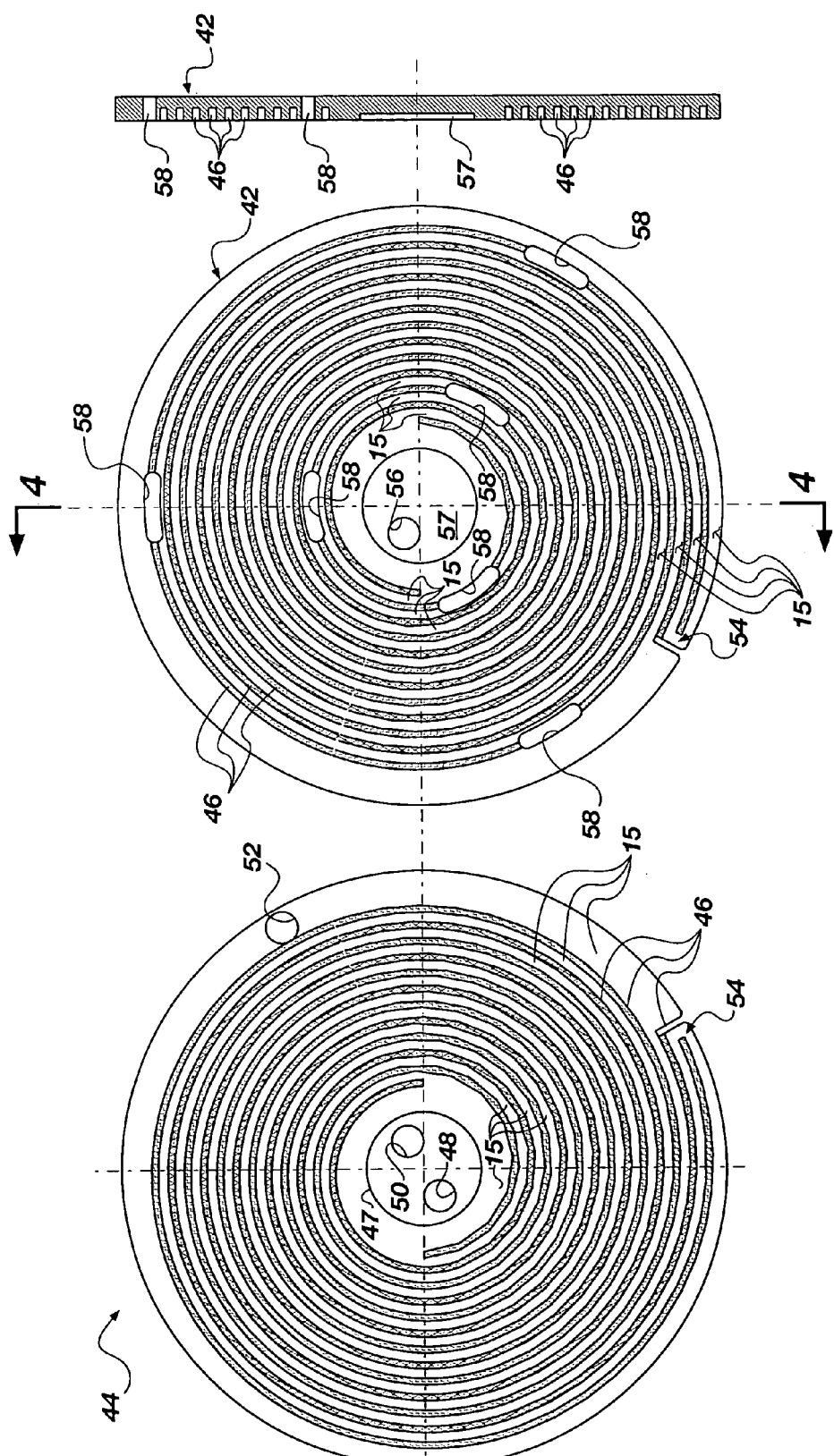

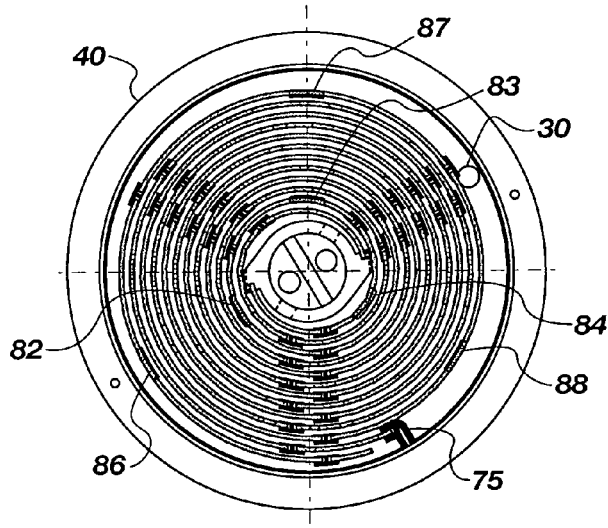
FIG. 8C
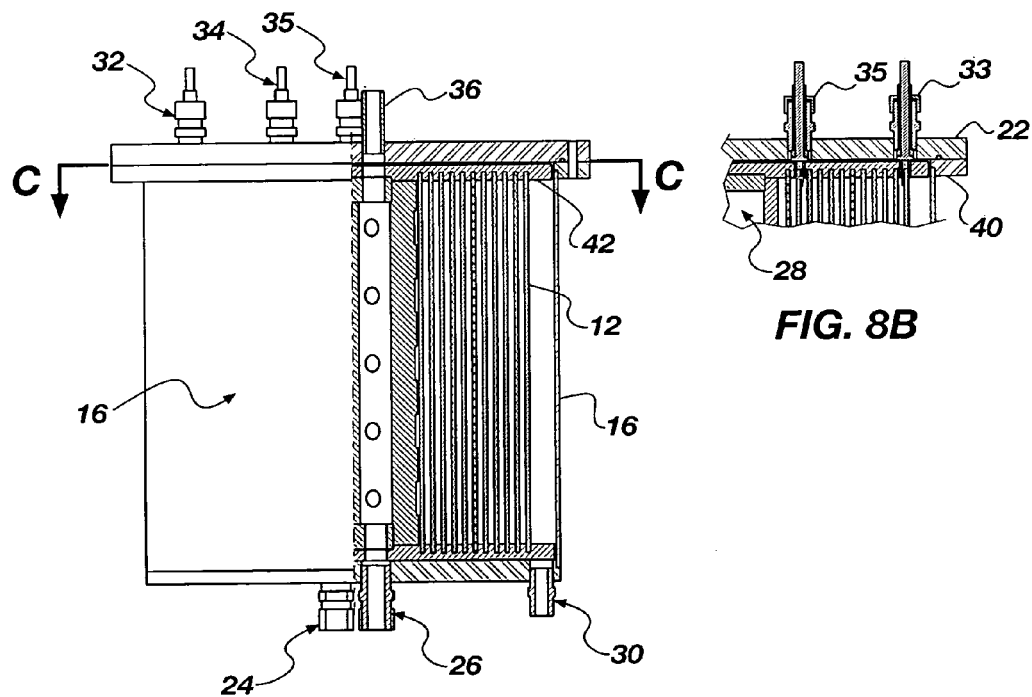
FIG. 8B
FIG. 8A

ELECTROCOAGULATION SYSTEM

Priority is claimed of U.S. Provisional Application Ser. Nos. 60/460,774 file Apr. 2, 2003 and 60/460,441, file Apr. 4, 2003 the disclosures of which are incorporated herein by reference for the teachings therein consistent herewith; and in the case of inconsistency this document shall control.

BACKGROUND

The present invention relates generally to water treatment systems. More particularly, the present invention relates to electrocoagulation systems for removal of undesirable substances from a treatment stream.

Electrocoagulation has been used in water treatment, particularly wastewater treatment for many years, and the processes involved are well known to those skilled in the art. An electrical potential is applied between a cathode and an anode positioned so as to create an electric field in the water stream, the water and dissolved substances therein being an electrolyte. If at least one of the cathode and anode is sacrificial, ions therefrom migrate into the electrolyte and bond with impurities to create precipitates, which can be physically removed from the water stream by means such as floatation, sedimentation and filtering. Moreover, disassociation of water molecules forms oxygen in multiple forms, hydrogen and hydroxyls, which several species can also be involved in beneficial reactions, e.g. oxidation-reduction reactions, and can also interact with biologics, if present, with treatment effect. Moreover, microbubbles formed can physically interact with suspended materials and forming precipitates to aid in removal by floatation or aggregation. The process has other uses, such as breaking emulsions, and other known applications known to those skilled in the art.

Various alternatives are known. As another example, depending on the water treatment stream to be treated, additives can be used. These can be used with non-sacrificial cathodes and anodes to form ions to interact with solutes and particulate matter in coagulating out of suspension and solution the impurities desired; or with sacrificial cathodes and anodes, to enhance the process in some way. As an example, salts can be added to increase the conductivity of the water stream to enhance electrocoagulation processes, which salts also are typically later removed, or are involved in the chemical processes and form precipitates.

As is known, treatment of various water streams containing numerous kinds of impurities, including heavy metals and other undesirables can be enhanced using the technique. For this reason electrocoagulation processes (sometimes called by other names) have been used in mining, food processing, manufacturing, and other industrial applications in addition to sewage and other water treatment applications.

Further, it is known that applying the electric field to the water stream in and of itself can kill at least some microorganisms suspended therein, for example by means of the osmotic pressure exerted on cell walls. Contact with oxygen species generated, and also with other species and reaction products that may be generated, can have a biocidal effect. Also, as precipitates and accreted bubble/precipitate/suspended materials complexes form, microorganisms may also be caught up in and trapped in coagulating materials and be carried out with the precipitates. So electrocoagulation can have at least some biological treatment effects as well.

For the process to be economically viable, it must be efficient, as large amounts of power may be needed to create the fields and electrochemical effects necessary to the process. Therefore improvements in effectiveness of the process, and decreases in downtime for maintenance and electrode (cathode or anode, or both) replacement are highly desirable.

Further, to the ends of efficiency, the process is usually used with fairly consistent treatment streams, so that it can be tailored to a particular stream having a particular overall chemical makeup and set of contaminants to be removed. The process is tuned to the waste stream by optimizing the voltage, electrode materials, additives (if any), flow regime (fast, slow, turbulent, laminar, etc.) to get the best results. While this works well for particular unchanging water streams to be treated, it does not lend itself to variable treatment streams which can change in temperature, pH, chemical and biological makeup, and in undesirable impurities to be removed.

SUMMARY OF THE INVENTION

The inventor has recognized that it can be advantageous to provide an electrocoagulation system that provides a variety of conditions to which the water stream is subjected as it transits the system. Changes in field strength, flow regime, polarity, and in particular a more rapidly changing electrical field of higher and lower intensities, can have a beneficial effect on treatment efficiency, and enable treatment of a wider variety of water treatment streams, and better accommodate fluctuations in water stream parameters, for overall better treatment by this method.

An electrocoagulation system configured for treating a treatment stream can comprise: a) a containment having an inlet and an outlet; b) a plurality of plates carried within the containment and configured to provide distributed electrical potential to facilitate formation of an electric field within the containment through which the treatment stream passes; c) an elongated fluid pathway configured to direct the treatment stream within the containment, extending from the inlet to the outlet, and in contact with the plurality of plates, said pathway being configured to create a multiplicity of flow regimes in the treatment stream; and d) a controllable power supply configured to provide variable electric potential to said plurality of plates, at least one plate acting as a cathode and at least one plate acting as an anode, and the system being configured so that a plurality of plates can act as the cathode and a plurality of plates can act as the anode; the system being configured so that as a treatment stream transits the elongated pathway it can be subjected to a multiplicity of combinations of electrical field regimes and flow regimes, the electrical field regimes being variable independently of the plurality of flow regimes.

In another aspect of the invention, an electrocoagulation system can be configured to treat a treatment stream by at least the following process steps: a) confining the treatment stream to an elongated fluid pathway; b) subjecting the treatment stream to a multiplicity of electric field regimes during transit along the elongated fluid pathway, the electric field regimes being controllably alterable for improved treatment of the treatment stream; and c) subjecting the treatment stream to changing flow regimes during transit along the elongated fluid pathway, the flow regimes and the electric field regimes cooperating to give improved treatment results.

In a more detailed aspect, the invention provides an electrocoagulation unit having at least two non-contacting substantially parallel plates forming at least a portion of an elongated fluid pathway having a compact and turning configuration. An inlet can be provided at the center of an innermost cylindrical area. In one further detailed aspect of the present invention, two substantially parallel plates can be spiraled coaxially such that fluid which enters the innermost cylindrical area follows a spiral path outward and then upon reaching an outermost cylindrical area is directed along a spiral path between the two plates back toward the innermost cylindrical area. In another more detailed aspect of the present invention, multiple concentric cylinders are placed coaxially, each cylinder having a non-conductive spacer which directs flow into an adjoining annular space of an adjacent cylinder. In another more detailed aspect of the present invention, at least two parallel plates can be spiraled coaxially in a substantially rectangular shape. Such a rectangular configuration can be utilized in either the spiraled or concentric embodiments of the present invention.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a side elevation view, partly crossectional, of an electrocoagulation apparatus in accordance with principles of the invention;

FIG. 1A is a crossectional view of a portion of the apparatus shown in FIG. 1, shown cut away from the remainder;

FIG. 2 is a top view of a bottom plate support of FIG. 1, formed of a dielectric material, separated from the plates and other structure for clarity;

FIG. 3 is a bottom view of a top plate support of FIG. 1, formed of a dielectric material, separated from the plates and other structure for clarity;

FIG. 4 is a crossectional view, taken along line 4-4 in FIG. 3 of the plate support shown in FIG. 3.

FIG. 8A is a side view, partly in cross section taken along line A-A in FIG. 8D of the apparatus shown in FIG. 1;

FIG. 8B is a partial crossectional view, taken along line B-B in FIG. 8D of the apparatus shown in FIG. 8A;

FIG. 8C is a crossectional view, taken along line C-C in FIG. 8A, of the apparatus shown in FIG. 8A;

Figure 5:
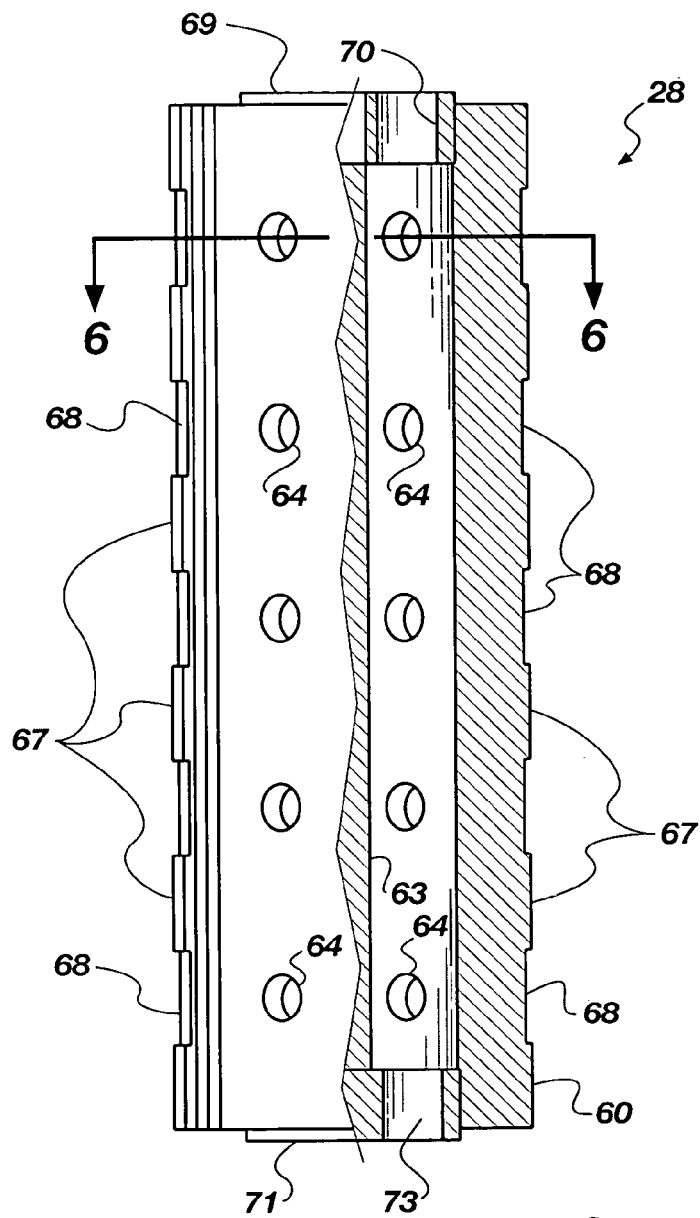
FIG. 5 is a side elevational view, partially in cut-away and partially in cross-section, of a supply manifold of the apparatus shown in FIG. 1 separated from the other elements for clarity.

It will nevertheless be understood that no limitation of the scope of the invention is intended. Alterations and further modifications of the inventive features illustrated herein, and additional applications of the principles of the inventions as illustrated herein, which would occur to one skilled in the relevant art and having possession of this disclosure, are to be considered within the scope of the invention.

DETAILED DESCRIPTION OF EXAMPLE EMBODIMENT(S)

With reference to FIG. 1, in an illustrated embodiment the electrocoagulation system 10 can be configured cylindrically, with generally concentrically disposed plates 12 supplying ions to the treatment stream 14 directed spirally within the device. This configuration provides an elongated fluid treatment pathway 15 and longer treatment time, as well as contributing to variation of conditions to which the treatment stream is exposed during transit of the elongated pathway in treatment as will be described in more detail below. An electric field, which can be varied in intensity as the treatment stream travels along the fluid pathway, which can be switched on and off, in different parts of the system at different times, even reversed in polarity, is provided by a switching controllable power supply 17 operatively connected to the plates as will be described.

In further detail, the system 10 includes a containment 16 which is cylindrical in this embodiment. The containment includes a cylindrical sidewall 18, a bottom plate 20, and removable top plate 22. The containment can be made of a suitable material, for example metal and metal alloys such as stainless steel, or of a polymeric resin such as PVC, or of a suitable composite material such as a glass fiber and resin matrix. The electrocoagulation processes occurring within the containment can be (and typically are) conducted under superatmospheric pressure or subatmospheric pressure, depending for example, on whether disassociation is to be encouraged or suppressed, or depending on other factors. Accordingly, the containment can be made robust enough to contain the pressure/vacuum used in a particular situation, or for a reasonable variety of anticipated situations.

An inlet 24 and outlet 26 are provided through the bottom plate into a manifold 28 that will be further described below. The treatment stream 14 enters one part of the manifold, travels the elongated pathway 15 between the plates 12 and exits through another part of the manifold. A service fitting 30 is provided in the bottom plate facilitating draining of the containment, and also flushing of sediments out of the elongated pathway. The service fitting can also be used to inject additives midway along the elongated pathway as will be appreciated from the description below.

The removable top plate 22 of the containment 16 allows access to its interior, for changing out plates 12 when sacrificial loss of material warrants, and other maintenance, cleaning, and inspection, for example. The top plate is perforated by insulated electrode connections (e.g. 32, 34), as well as an off-gas fitting 36 fluidly communicating with an outlet portion of the manifold 28 allowing gas generated by disassociation and/or any reactions occurring within the containment to be bled off. Fasteners (not shown) for example threaded fasteners, which can create a clamping force can be inserted through holes (e.g. 38) near the outer edge of the top plate and a flange 40 attached to the sidewall 18 of the containment. A seal (not shown) can be established by applying a sealant to the top plate 22 and flange 40 before attachment, or by use of a gasket, O-ring, or the like.

One electrode connection 32 is electrically connected to one of the plates at an outer portion of the plates 12, and one connection 34 is connected to one of the inner plates, to cause one to act as a cathode and one as an anode. These can be reversed by reversing polarity of the electrical potential and therefore the direction of the current supplied by the switching power supply 17 during operation, which reversal has utility in water treatment and device maintenance as will be explained. This configuration can be further appreciated with respect to FIG. 1A as well as FIG. 1, wherein insulated electrode connections 33, 35 can be seen connected to an outer plate segment 37 and inner plate segment 39, respectively.

Dielectric plate supports 42, 44 on the top and bottom, respectively, of the plates 12 insulate, support, and hold in alignment, the plates of the system 10 as well as the manifold 28. These dielectric plate supports can be formed of a polymer resin having good insulative qualities. Spiral groves 46 in the plate supports receive the top and bottom edges of the plates.

These plates can be better appreciated with reference to FIGS. 2, 3 and 4. The bottom dielectric plate support 44 (FIG. 2) defines openings 48, 50 for the inlet and outlet, respectively, and an opening 52 for the service connection 30. The configuration of the elongated fluid pathway 15, which is defined on a bottom portion by the bottom dielectric plate support, can be seen between the grooves 46 formed in the plate. It will be appreciated that a pathway spirals out from a central portion 47 defining the inlet and outlet, and where the manifold (28 in FIG. 1) will be positioned, out to a reversing portion 54 of the pathway 15 at an outer portion, where it changes direction and passes the opening 52 for the service connection and then spirals inward to the central portion again.

This spiral configuration of the fluid pathway 15 and the grooves to catch the edges of the electrode plates (12 in FIG. 1) is mirrored in the top dielectric plate support 42 shown in FIGS. 3 and 4. An opening 56 for the out gassing outlet is defined in a central portion 57 which will support the top of the manifold, the opening being in fluid communication with the outlet portion of the manifold when assembled. Additionally, electrode openings 58 are provided so that the electrical connections can be made to the plates (12 in FIG. 1) as will be described herein. The spiral configuration reduces head loss through the elongated fluid pathway. Moreover, in combination with certain restricted portions of the elongated fluid pathway (which will be set forth below) the configuration gives generally a highly active and diverse set of flow regimes for the treatment stream. This is advantageous in providing for mixing and contact, sweeping bubbles off plate surfaces, and also for keeping the system clean (particularly in combination with periodically reversing polarity of electric current in the system which can be used to free deposited scale/plated materials from the electrode plates).

Figure 6:
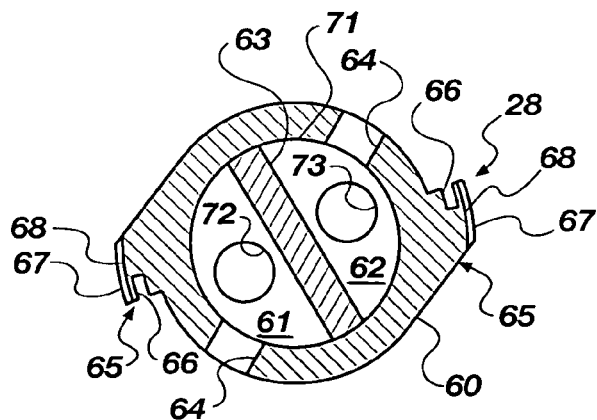
FIG. 6 is a crossectional view, taken along line 6-6 in FIG. 5 of the manifold shown in FIG. 5.

With reference to FIGS. 5 and 6, the manifold 28 will now be described in more detail. A generally tubular member 60 has an interior divided into an inlet portion 61 and outlet portion 62 by a dividing wall 63. A plurality of distribution openings 64 allow water to pass to and from the elongated pathway (15 in FIG. 1) out from and in to the manifold interior portions. Bracing arm portions 65 extend outward from the manifold and include slots 66 which mate with edges of the interior-most plates (12 in FIG. 1, but best appreciated with reference to FIG. 7) and extensions 67 which brace the next more outward spiral plates and provide for a clearance for fluid to pass. Channel portions 68 between the extensions provide spaces to allow water to pass by the bracing arm portions at outward ends thereof between the extensions, and it will be appreciated that high velocities and turbulent mixing will be associated with passing through these spaces for some length along the elongated pathway afterward.

An upper end cap 69 includes an opening 70 for fluid communication to the de-gas fitting (36 in FIG. 1). A lower end cap 71 includes holes 72, 73 for fluid communication with the inlet and outlets (24 and 26 in FIG. 1). It will be seen that the end caps extend outward from the ends of the generally tubular member 60. The end caps are received in the central portions 47, 57 of the bottom and top dielectric plate supports (44, 42 in FIGS. 2 and 3). This configuration allows stable inter-fitting of the various parts e.g. manifold 28, dielectric plate supports, and plates (12 in FIG. 1), when assembled in the electrocoagulator containment (16 in FIG. 1), but also allows them to be disassembled easily for cleaning, plate changing and other maintenance.

In one embodiment, the configuration of the plates 12, manifold 28, and top and bottom dielectric plate supports 42,44 can be substantially similar to that described above, but these can be formed as a cartridge, that is to say, the elements can be attached together by adhesive, thermal welding, co-curing, etc. into an integral construction that can be replaced as a unit. In this embodiment an outer cylindrical layer of dielectric material (e.g. such as that (133) shown in FIGS. 16 and 17) can be provided, and can be connectable to the top and bottom dielectric plates, forming a sealed canister that can be slipped into the containment, and removed there from, as a unit.

As mentioned, the containment 16 can be formed of metal, but can also be made of PVC or another suitable polymeric resin. Moreover, particularly in the later embodiment, it can be molded, and also can comprise as few as two pieces, e.g. configured as a clamshell, or with a bowl and a lid configuration (not shown), though otherwise it can be as described herein.

Figure 7:
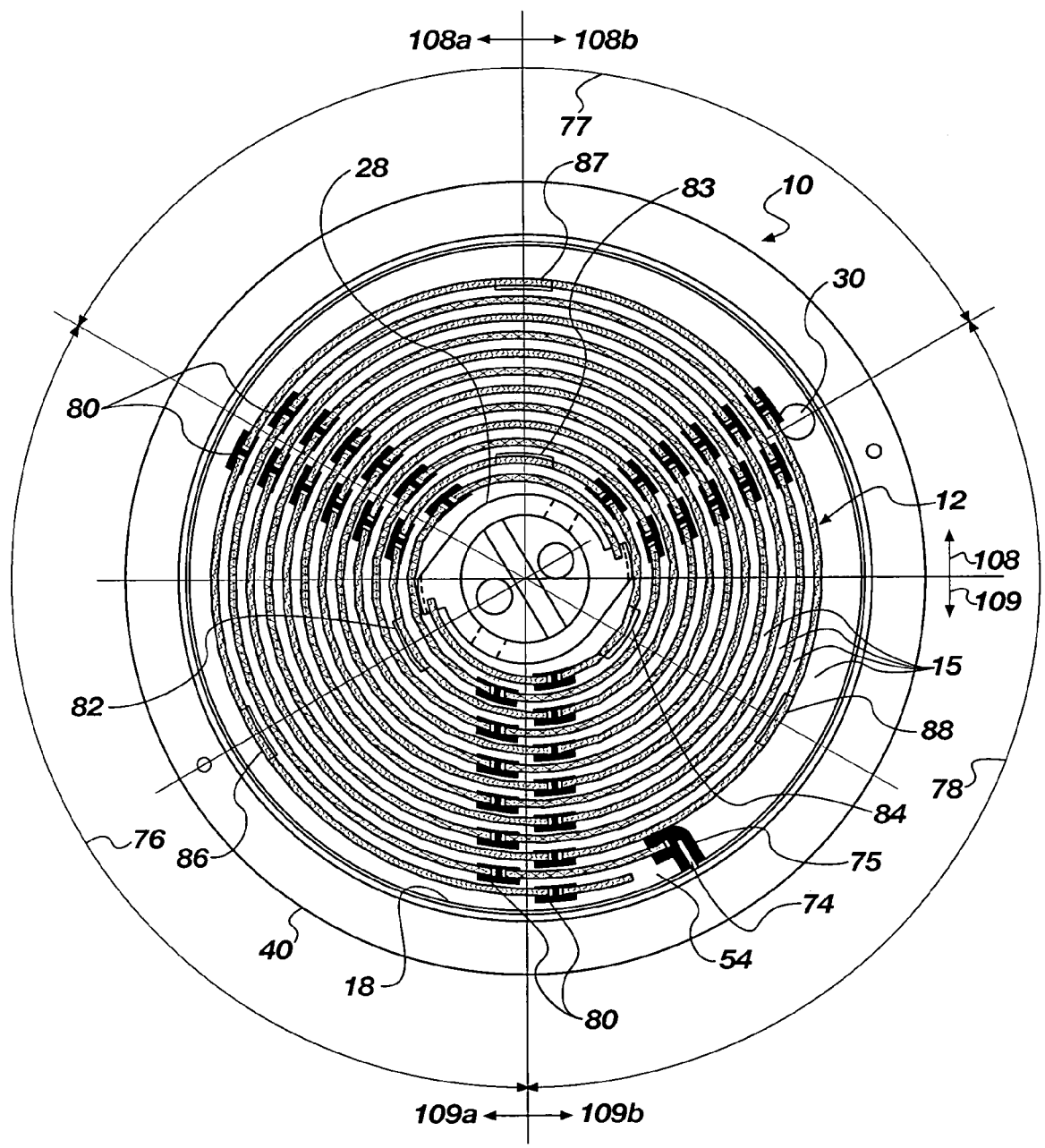
FIG. 7 is a crossectional view, taken along line 7-7 in FIG. 1 of the apparatus shown in FIG. 1.

With reference to FIG. 7 further details can be appreciated, as well as the overall scheme of the elongated fluid pathway 15 and plates 12. A flange 74 extending inward from the cylindrical sidewall 18 of the containment 16 cooperates with a plate segment insulator elbow 75 to provide the reversing portion 54 at an outward potion of the plates 12, and about midway along the elongated fluid pathway 15. The reversing elbow has raised portions and cut out portions (67 and 68 in FIG. 5) similar to those of the manifold to allow fluid flow past the outside of the elbow.

It can also be appreciated that the plates 12 are divided into segments, and that generally three zones 76, 77, 78 of segments are created by plate segment insulators 80 mechanically connecting and electrically insulating the plate segments to and from each other. The plate segment insulators are formed of a dielectric material, such as a polymeric resin. Inner electrode lugs 82, 83, 84 welded to inner plates are configured to extend upward into the top dielectric plate support (42 in FIG. 1) and contact inner electrode connectors (e.g. 34 in FIG. 1) which will be more particularly described below. Outer electrode lugs 86, 87, 88 are likewise configured to contact outer electrode connectors (e.g. 32 in FIG. 1).

With reference to FIG. 7 particularly, it can be appreciated that the respective zones can be energized independently. That is to say, the zones 76, 77, 78 can be turned on and off at different times, can be energized at different power levels, and can be independently reversed in electrical polarity. It can be further appreciated that due to the pie-segment geometry of the zones that the intensity of the electrical field will be much greater toward the inner electrode connections than at the outer periphery, because the current per square inch will be much higher. The inner electrode lugs are attached to plates with much less surface area than those connected to the outer plates. In the illustrated embodiment the area of distributed potential on the outer plates is roughly three times greater than that of the inner plates. Accordingly the first and last portions of the elongated fluid pathway 15 can have associated with them field intensities much higher than that of the middle portion of the elongated pathway located towards the outer portions of the plates 12. Therefore, even in steady-state operation the treatment stream is subjected to a variety of field strengths as it transits the elongated pathway.

However, as mentioned, it has been found advantageous to have the capability of further variability of the field regime in which the treatment stream flows. A pulsing field has been found to work well in treatment, and appears to provide better energy efficiency in the treatment process. Moreover, reversing polarity appears to have the effect of knocking scale, including plated material, off the electrode plates (cathode and anode by turn), and gives longer times between those conditions wherein the device needs to be cleaned, or that a scale build up on, rather than sacrificing of, the cathode and/or anode requires cleaning or changing out of the plates. It will further be appreciated that the configuration simply provides a lot of metal surface area in the electrocoagulator. It will be appreciated that the voltage drop across each plate (moving inward or outward according to polarity) will be substantially uniform, and accordingly the smaller plates may be sacrificed at a greater rate than the bigger plates, all other things being equal. Accordingly, depending on preference the system can be operated so that the inner plates are designated as sacrificial and routinely changed more frequently, or so that the outer plates are primarily, or preferentially, sacrificed, and longer intervals between plate change-outs are thus made possible. Depending on conditions and plate materials used, relative timing lengths of the current polarities can be adjusted for treatment and operational effects, including operating the system so that the plates are sacrificed substantially evenly, using timing and polarity to control the rates of sacrifice of the inner vs. that of the outer plates.

Further, it will be appreciated that although potential is supplied to one, or two, segments 76, 77, or 78 potential will appear in the plates 12 in the segment or segments not energized, as it will be carried out of the zone by the electrolytic properties of the treatment stream. Residual effects from inherent capacitance of the configuration, and electrical bleed-over though the water acting as a conductor can give rise to these effects. As an example, if a steady 35 volts is initially applied across one zone e.g. 76, it has been observed that about a 15 volt differential will be seen in that zone and that about a ten volt drop will be seen across each of the two the non-energized zones e.g. 77, 78. The current can be substantially likewise divided. Thus while the segments can be individually energized, or not, there will be an interaction through the treatment stream. It will be appreciated that the electrical interplay can be used to effect, for example smoother functions of potential/current vs. time can be observed, even though the inputs may be essentially square wave.

Further, patterned activation of the zones 76, 77, 78 can give rise to pulsitile voltage functions as seen by the treatment stream. Moreover, treatment continues after power ceases to be supplied, during decay of the potential. All in all, this allows power to be intermittently applied, saving energy. Further, using a capacitive device (17a in FIG. 1) a lower-rated power supply (105 in FIG. 10) can be used to provide intermittent pulses at much higher power, Such potentials, taking longer to decay, enable higher fields momentarily, with decay afterward, without necessarily requiring additional energy input to the system.

As an example, a pulse width time can be set and the zones activated sequentially. The full range of field intensities is felt by the treatment stream and in a varying, pulsing, sawtooth, sinusoidal, or other manner, but which is produced by a power supply essentially producing a constant potential at a constant power. In another embodiment, the power supply can be made to switch on and off, and this combined with the switching arrangements on the zones, and/or capacitors in the circuit, can produce large doses of energy for shorter periods of time with longer times for decay. Moreover, the voltage can be allowed to decay to zero, remain there for a time and then be brought high again as the particular zone is re-energized. It will be appreciated that considerable variation in electric field effects is possible.

Furthermore, in one embodiment adjacent zones, e.g. 76, 77, can be simultaneously energized, but at opposite polarities. In this way local areas of relatively intense electric fields will be generated. These fields will be oriented transversely to the ones usually created where the current flows in a radial direction. This capability adds a further parameter that can be altered in creating the multiplicity of electric field regimes creatable in the system 10.

In light of the foregoing, there is considerable variety of electric field regimes which are made possible by the example system 10. Moreover, it will be appreciated that field effects new to the art are described.

Still referring primarily to FIG. 7, the plates 12 can be made of conventional cathode/anode materials used in electrocoagulation processes. For example aluminum and aluminum alloys, and iron, and iron alloys. Other metals and alloys can be used as known in the art. In the case of use with a specific wastewater stream, or targeting for a specific metal or other contaminant to be removed, the cathode and anode materials can be selected to optimize for that situation. Moreover, the plate material used can be inert (e.g. carbon) and additives can be used to obtain the objectives sought, all as is known in the art.

The plates 12 are formed in segments of varying radii, and assembled as in the illustrated embodiment, for example by placing them in the channels 46 formed in the bottom dielectric plate support 44, consecutively, with the segment insulators 80 placed there between. The channels in the top and bottom dielectric plates (42, 44 in FIGS. 2 and 3) can be interrupted in one embodiment (not shown) to facilitate placement of the plates, or can have expanded width portions (not shown) to accommodate the segment insulators 80 and guide placement.

It will be appreciated that the total voltage drop from cathode to anode, in either direction, will be divided between the number of plates and adjacent fluid pathways, assuming the spacing between plates is relatively even. Accordingly the voltage across each intermediate plate will be the total voltage divided by the number of fluid filled spaces (resistances) between the plates that the current crosses. This assumes the plates have essentially the same resistive properties, as well as a treatment stream 14, which does not fluctuate wildly in resistance (i.e. during the residence time so that it is significantly different at one part of the elongated fluid pathway 15 from another part of the pathway, which assumption will hold most but not all of the time). Again, since the plates have different surface areas the field intensity will vary accordingly.

As mentioned above, it has been observed that there is some capacitive effect of the configuration shown in FIG. 7. That is to say, when one segment is turned on and then off, there is a decay of potential across the segment, rather than an immediate drop off. This can be used in operation to maintain at least some field intensity in all the segments 76, 77, 78, but cause it to vary strongly from a low value to a high value. For example the segments can be energized sequentially, in a circular fashion, so that a particular segment is re-energized before it decays to essentially zero field strength. It will be appreciated that the treatment stream, flowing one way, and then reversing to flow the other way though such an electrical field regime will be subjected to a highly diverse set of electric field conditions during that journey. Moreover, this combined with the geometry of the system 10 creates a treatment environment where both the hydrodynamic (flow) regime and that of the electric field are highly variable over the course of the elongated pathway 15. Accordingly, a wider variety of treatment streams will, for at least some segment of the elongated fluid path, be subjected to conditions more nearly optimal for formation of precipitates of the constituent undesirable impurities desired to be removed. Thus the system is both tunable to some extent by variation of the electric field regime to that providing more optimal conditions for a longer period of time along the treatment pathway, to particular waste streams; and it is also accommodating of variable waste streams, by virtue of the wide variety of conditions creatable along the treatment pathway through the electrocoagulator of the system 10.

Furthermore, it has been found that the field changing/pulsing made possible by the system 10 has increased effectiveness in breaking down cell walls of biologics, to provide for kill, and for volume reduction of the biologics by dewatering the cells. This benefit is derived without costly additions to the system.

Figure 8D:
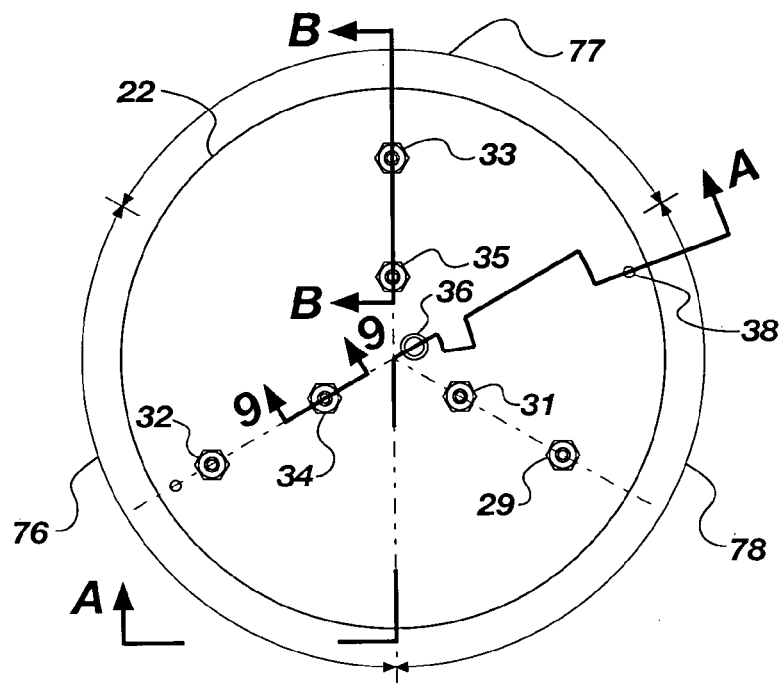
FIG. 8D is a top view of the apparatus shown in FIG. 8A.
Figure 8E:
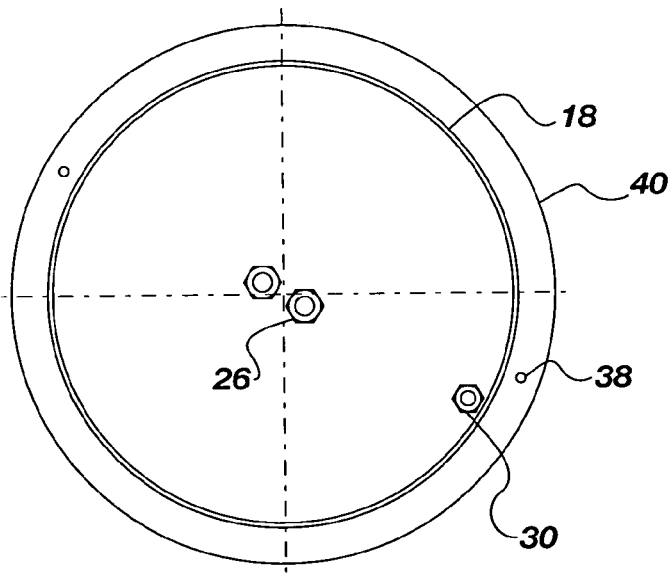
FIG. 8E is a bottom view of the apparatus shown in FIG. 8A.

With reference now to FIGS. 8A, B, C, D, and 8E, the overall scheme of the device can be further appreciated. Electrode connectors 29, 31, 32, 34, 33, 35 are positioned overtop plate connection lugs 88, 84, 86, 82, 87 and 83, respectively. And can be tightened down to firmly contact the lugs on the plates 12.

Figure 9:
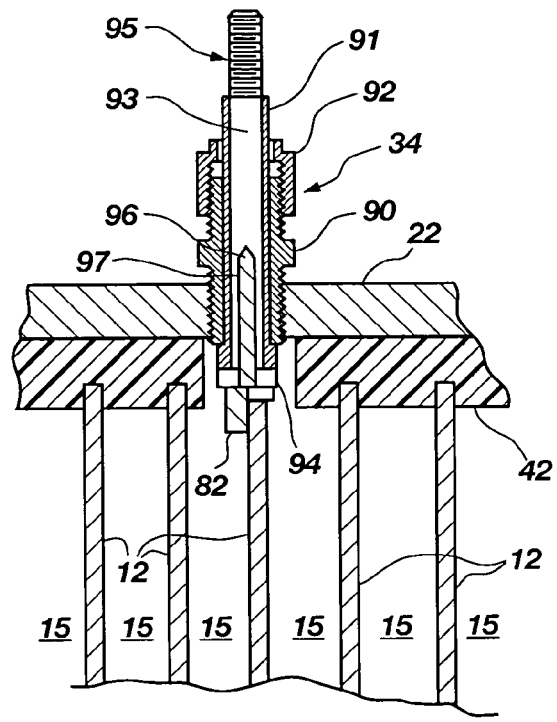
FIG. 9 is a partial crossectional view, taken along line 9-9 in FIG. 8D, shown broken out from surrounding structure for clarity, of an electrode connection in the apparatus shown in FIG. 8A.

Details of this electrical connection will be appreciated with reference to FIG. 9. Electrode connectors, e.g. 34, tightly connect with plate lugs e.g. 82 by tightening down a carrier sleeve 90 after the top plate 22 of the containment 16 has been fastened down. The electrode connection further includes an insulating sleeve 91, compression fitting 92 and threaded conductor bolt 93 having a lower flattened head portion 94 configured for contacting the lug and treaded portion 95 facilitating connection to the switching power supply (17 in FIG. 1) by means of heavy gauge electrical conductors (not shown). In one embodiment the lug is configured with a male connection portion 96 which extends upward into a bore 97 with an interference fit, to provide additional contact surface area which is more isolated from the treatment stream in the elongated pathway 15.

Figure 10:
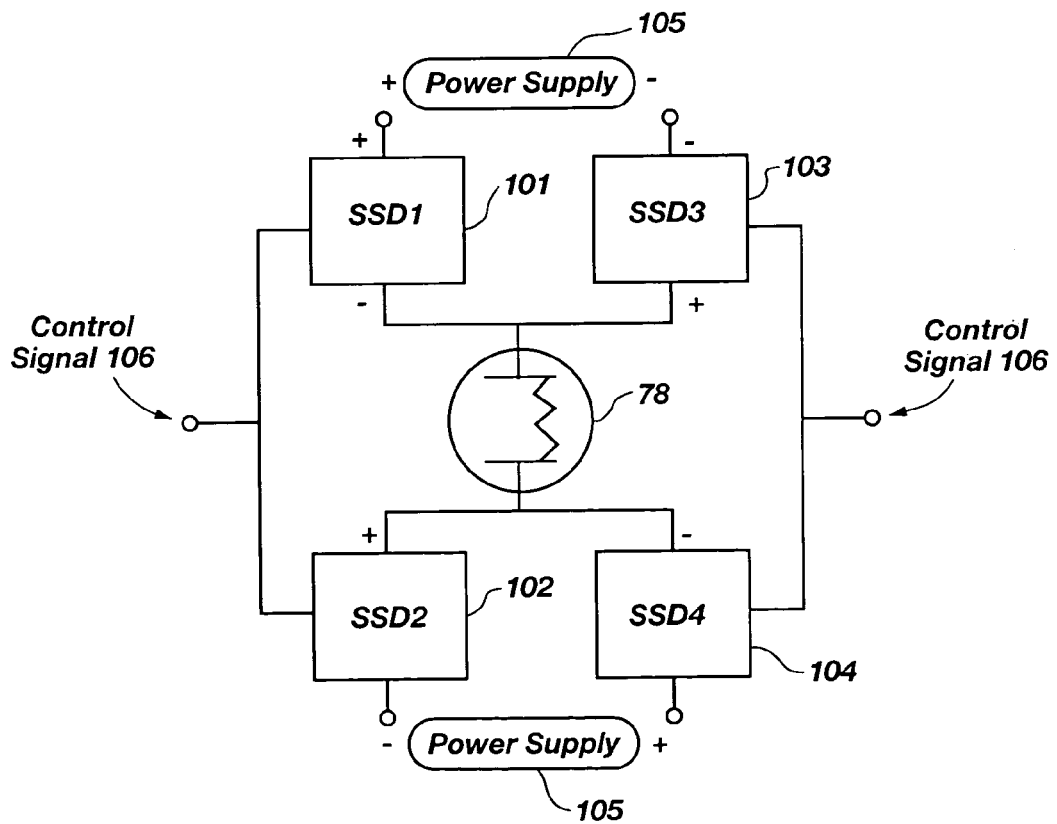
FIG. 10 is a schematic block diagram of a solid-state switching device H-bridge configuration for pulsing and reversing polarity of the electric field in a zone of the three zones of the apparatus shown in FIG. 7.

Returning to FIGS. 8A, B, C, D, and 8E, each zone 76, 77, 78 is connected to an H-bridge driver of the switching power supply (17 in FIG. 1), which can be further appreciated with reference to FIG. 10. For example, a zone 78, like the other zones, is connected to four solid-state switch devices 101, 102, 103, 104 and the general scheme of the electrical switching apparatus in one embodiment can be appreciated. These four solid-state switches in one embodiment can comprise MOSFET devices, and in one embodiment can further include blocking diodes of similar voltage/current handling characteristics as the switches on the outputs of each of the four MOSFET devices to prevent back EMF when a switch device is turned off. The control voltage for the MOSFETS is typically 3-5 volts DC for most commercially available devices. This can be widened by putting a voltage limiting circuit on the control input, which may include a rectifying circuit and voltage limiting circuit so that either an AC or DC control signal can be used, and/or a higher voltage control signal, and in any case configured so that the switching device MOSFET sees only 3-5 volts regardless of the characteristics of the control signal. However, in the illustrated embodiment the solid-state switch devices are controllable on a 5-volt control signal from a programmable microcontroller. Such microcontrollers, i.e. PLCs, and their use, are well known. One of the numerous conventional PLCs usable in this control application, widely commercially available from numerous manufacturers, can be used. As an example, a PLC product with a user interface and convenient connectivity found usable in the example system 10 is a Micro PANELMATE D-830, available from the CUTLER-HAMMER division of EATON Corporation, located in Milwaukee Wis.

The example switching apparatus shown is configured to cooperate with a conventional power supply 105, for example a three-phase 250 vDC, 60 amp, rectifying DC supply of requisite capabilities. It will be appreciated that the specifics of the power supply and switching gear will be determined by the size and power requirements of the system 10 and can be sized up or down. But regardless of size, a system 10 as described herein can be configured to enable supply of pulsable, variable, and reversible electric current to provide the electric field effects discussed above for each segment and the apparatus as a whole. Control signals 106 are provided to the switching devices by the appropriately programmed microprocessor control circuit (100 in FIG. 12), for example comprising a PLC as mentioned; or in another embodiment these can come from an appropriately interfaced PC, or other computing device, all of which can be conventional. Likewise the PLC, PC, etc. can be interfaced with the power supply to control current and voltage output. It will be appreciated that the pattern (or intentionally random nature) of local intensity, and relative distribution of the electric field, is thus made controllable. Moreover, given the configuration of the system in this embodiment, it will be appreciated that numerous effects, including rising and falling field effects acting on the treatment stream, can be achieved by switching and timing alone, using a constant current and voltage output from the power supply.

Figure 11:
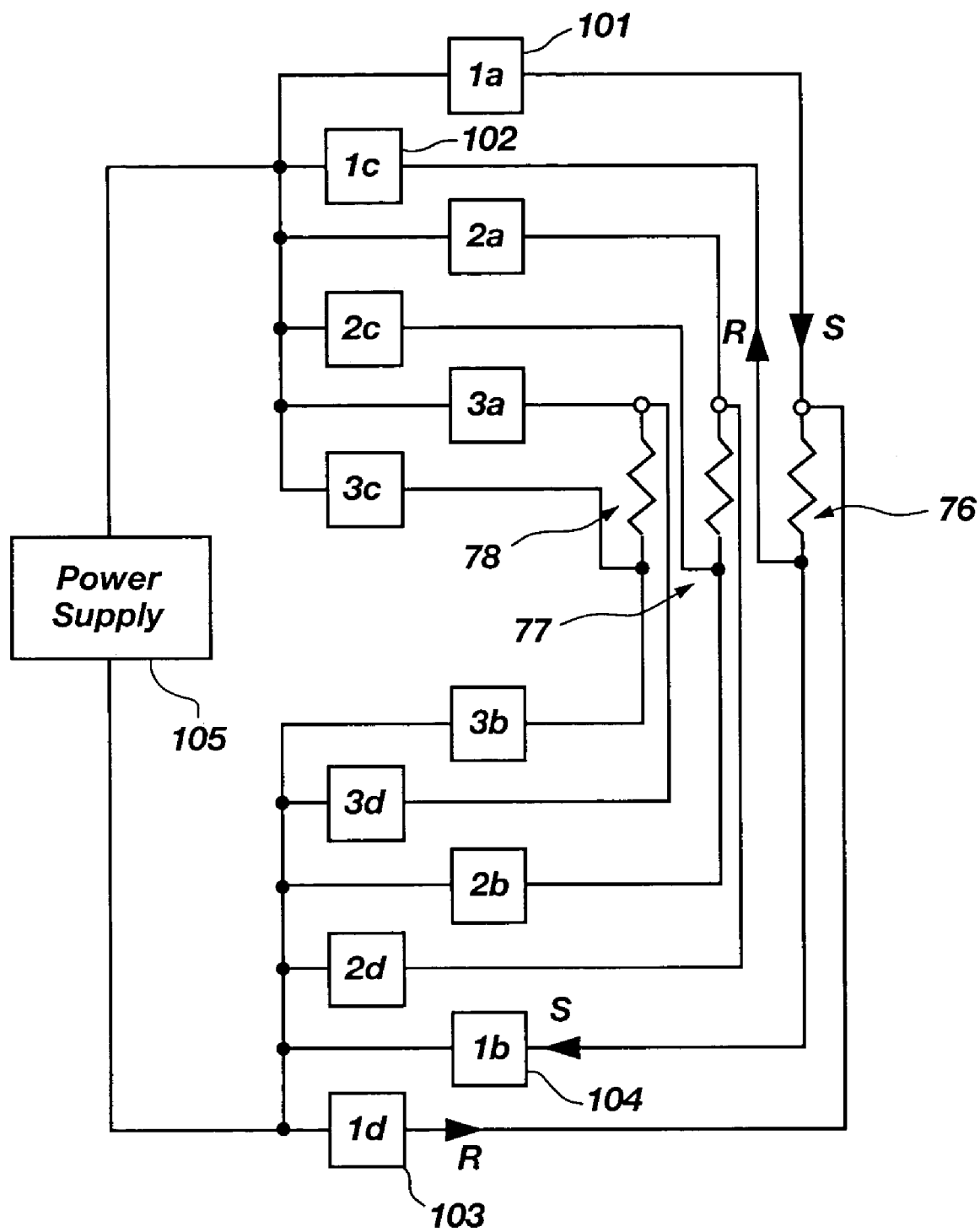
FIG. 11 is a schematic block diagram of a solid-state switching device H-bridge configuration for pulsing and reversing polarity of the electric field in the three zones of the apparatus shown in FIG. 7.

With reference to FIG. 11, a scheme for switching polarity and pulsing of all three zones, or segments, 76, 77, 78 independently, of electrical potential and current from the power supply 105 is shown. Connections to control circuitry are not shown for clarity. It will be appreciated that the current and voltage can be changed by controlling the output of the power supply 105 and/or by introducing additives adjacent the inlet (24 in FIG. 1) or intermediate the ends of the elongate fluid pathway (e.g. via the service fitting 30 in FIG. 1) or by capacitive effects as described above, whereas polarity is changed by controlling the solid state switches e.g. 101, 102, 103, 104. It will be appreciated that relays, or other switching gear can be used instead of solid state devices, and that the particular switch device used will be chosen based on economic considerations from among the numerous known alternatives.

Figure 12:
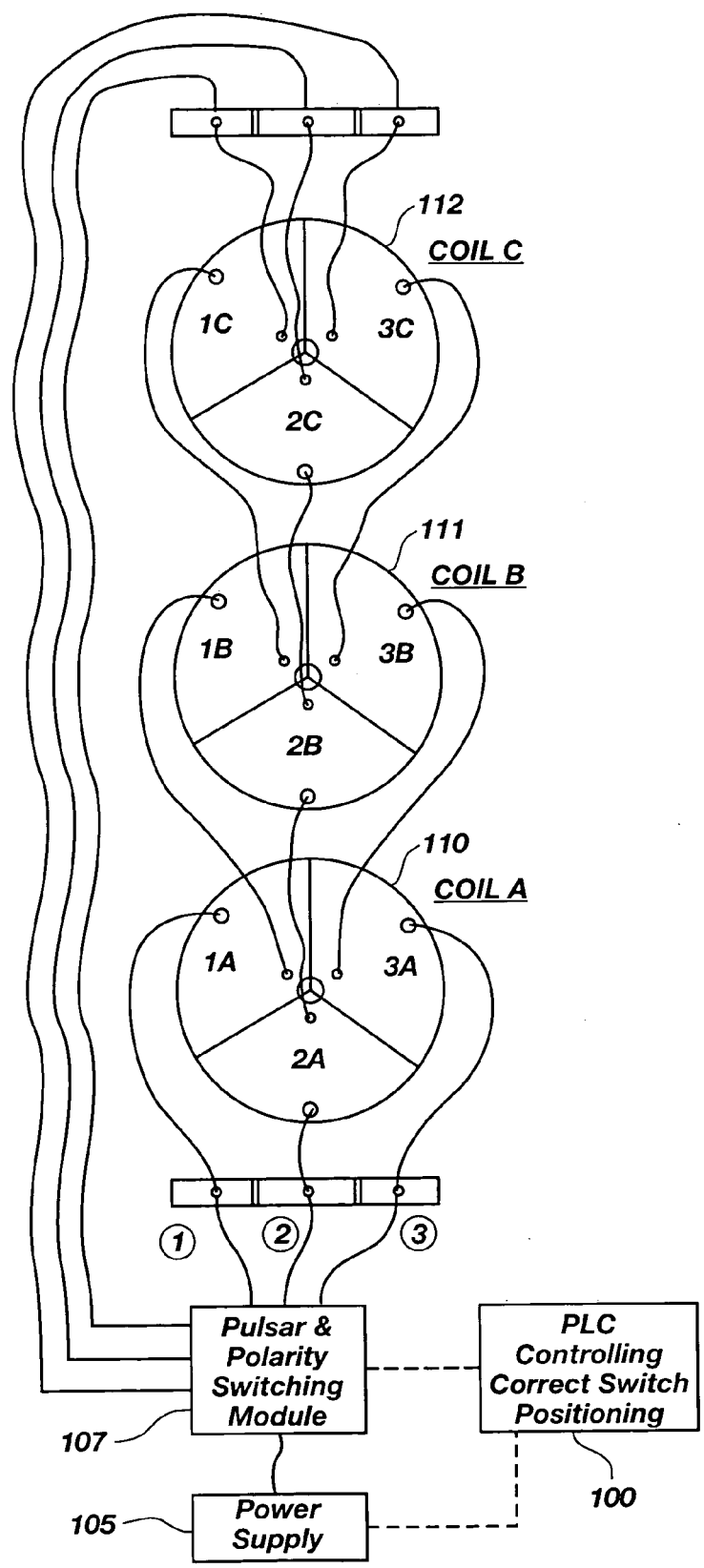
FIG. 12 is a schematic block diagram of an electrical connection scheme for a plurality of devices such as that shown in FIG. 7.

With reference to FIG. 12, in one embodiment one set of electronics 105, 107 powers and controls a plurality of electrocoagulators 110, 111, 112. This configuration allows more increase in capacity than proportionate increase in cost. The electronics can be upsized, if need be, at less expense than duplication.

With reference again to FIGS. 7, 8A, B, C, D, and 8E, while three zones 76, 77, 78 are provided, it will be appreciated that another number of zones, for example two zones 108, 109, or four zones 108a, 108b, 109a, 109b can alternatively be provided by changing the geometry of the plates 12, placement of the insulators 80, and electrode connection (e.g. 84, 88) placement, etc. Also, by providing plates curled into 360 degree around spiral segments and only one insulator per turn, a one segment system can be provided. This will require more variation of electrical field parameters to get the variation of effects that may be desired, and plates are almost certainly more difficult to fabricate and bulkier to store, but the switching is simplified, and assembly and disassembly are also simplified.

Figure 13:
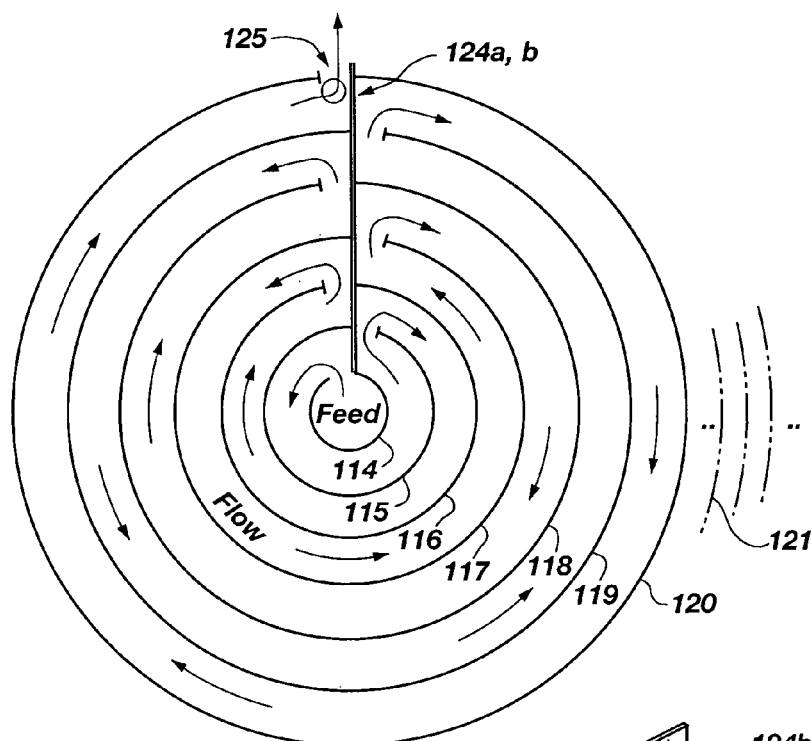
FIG. 13 is a top schematic crossectional view of and apparatus in another embodiment employing a concentric plate scheme rather than the spiral scheme of FIG. 7.
Figure 14:
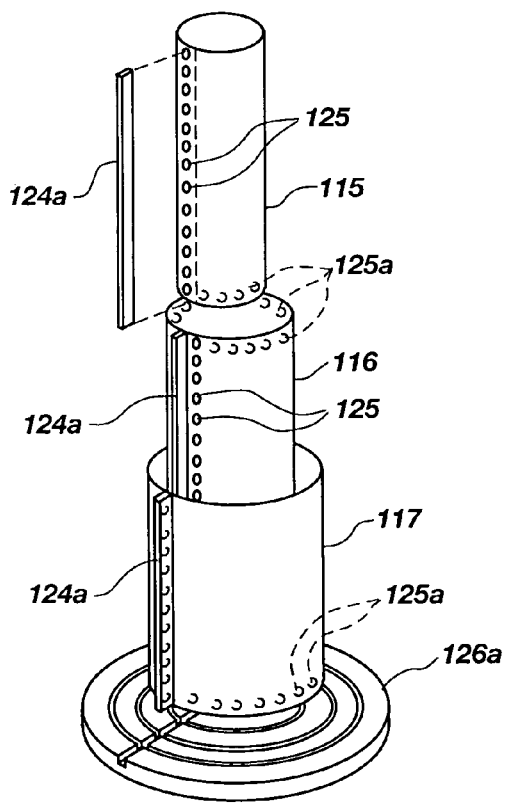
FIG. 14 is a perspective schematic representation of one possible implementation of the scheme illustrated in FIG. 13 using cylinders.
Figure 15:
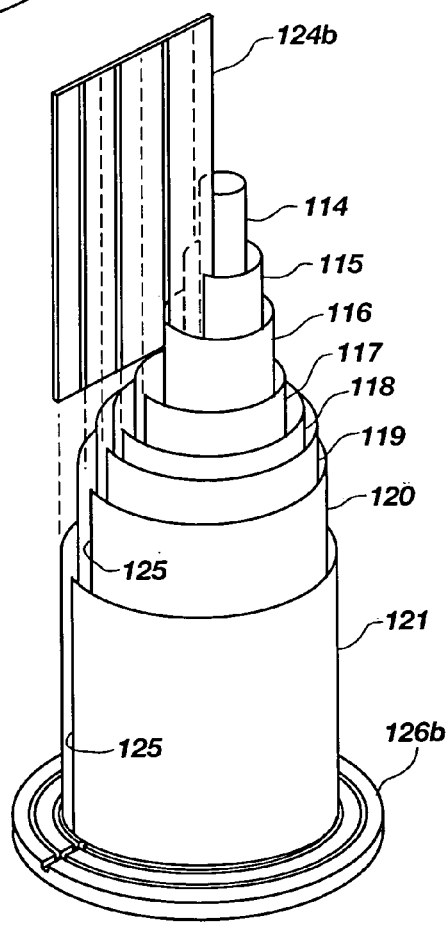
FIG. 15 is a perspective schematic representation of another possible implementation of the scheme illustrated in FIG. 13 using interrupted cylinders.

It will be appreciated that other ways of providing an elongated fluid pathway and variable flow and electrical field regimes can be used. For example, with reference to FIGS. 13, 14, and 15, instead of a spiral configuration described above, an elongated fluid pathway 15 can be provided by a series of cylinders 114, 115 . . . through 120, or more, e.g. 121, etc., configured as shown. The configuration includes one or more dielectric walls 124 provided to reverse flow direction, and openings 125 adjacent the walls to allow flow between cylinders. Interrupted cylinders (FIG. 15) can be used to provide the openings 125 or it can be done in other ways, for example by providing drilled, punched, cut-out, or otherwise fabricated holes (FIG. 14). As with the previously described embodiments, dielectric plate supports 126a, b and other insulating members are used to electrically isolate the plates (cylindrical) from the rest of the system and from each other. It will be appreciated that by providing holes (125a in FIG. 14) alternatively in the top and bottom portions of successive cylinders, that an elongated pathway that traverses up and down, rather than circularly, can be provided in the concentric cylindrical configuration.

Figure 16:
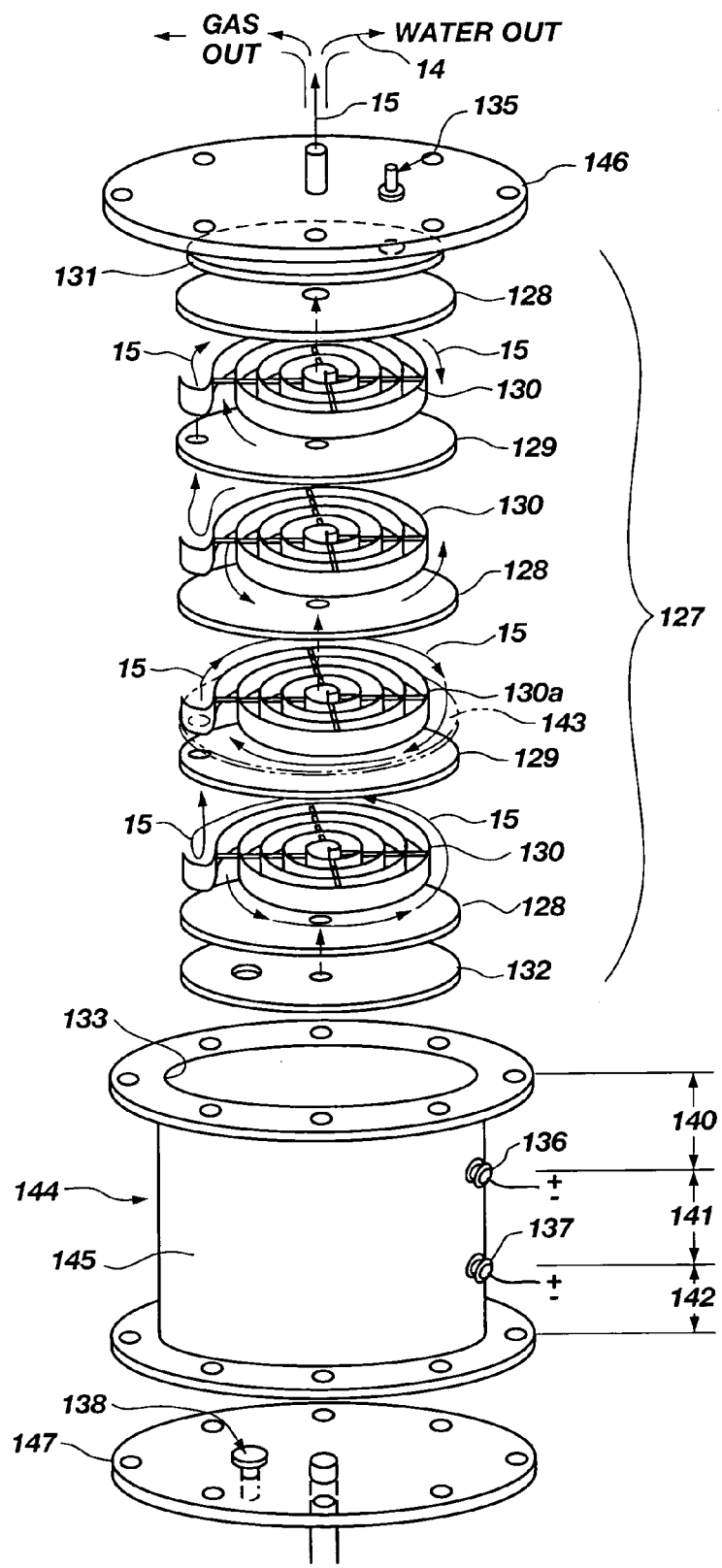
FIG. 16 is an exploded perspective schematic representation of an apparatus in accordance with another embodiment of the invention.
Figure 17:
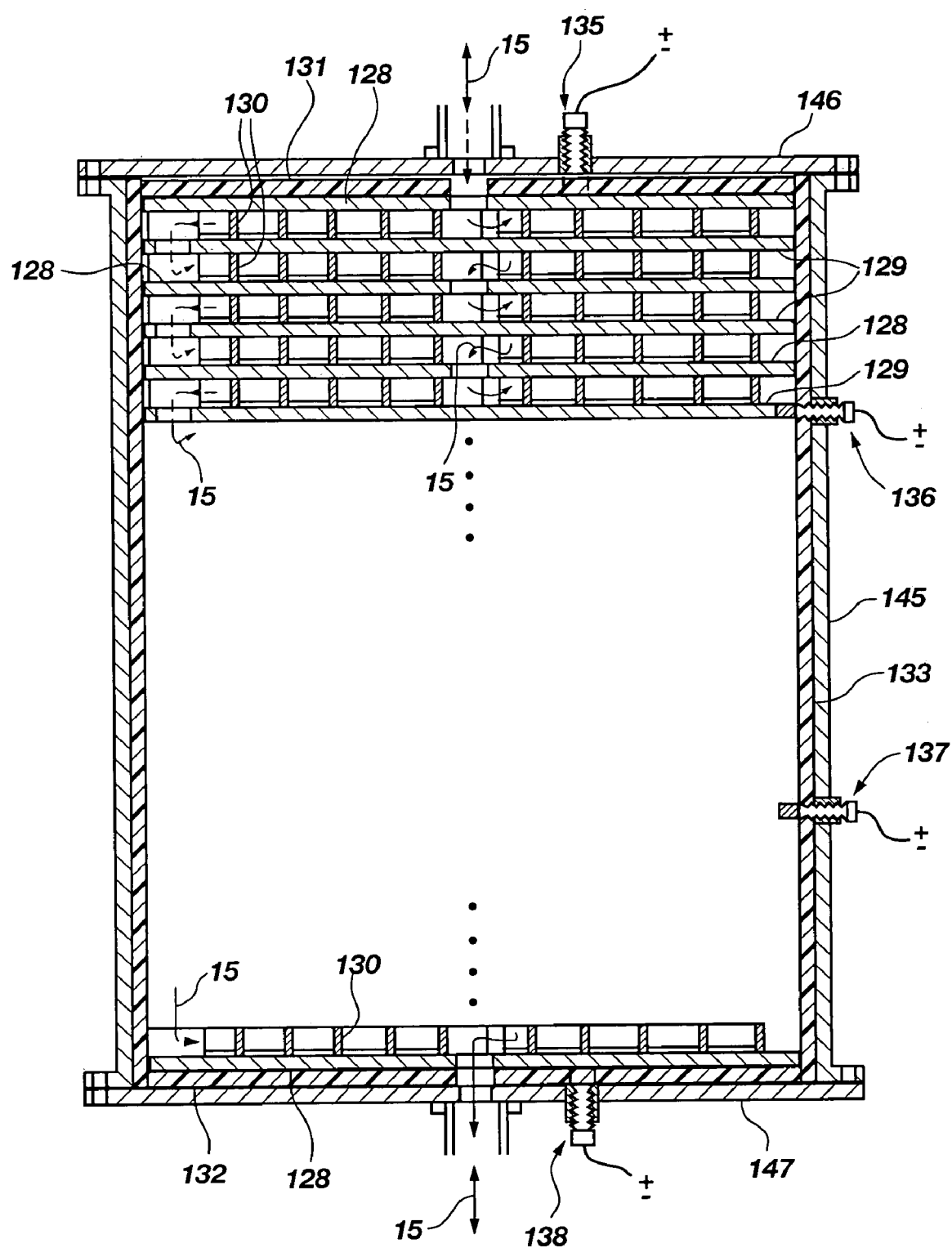
FIG. 17 is a side crossectional schematic representation of an assembled apparatus such as that shown in FIG. 16, some of the plates being omitted as repetitive of those shown.

In another embodiment shown in FIGS. 16 and 17, the elongated fluid pathway is provided by a packed column 127 comprising alternating plates 128, 129 and insulative molded flow guides 130 formed of a dielectric material such as a polymeric resin. The flow guides can be identical, and the plates alternately having a hole in the center and at the edge. The elongated fluid pathway 15, accordingly spirals inward and outward consecutively, as it traverses the packed column in a single direction. That direction can be upward, especially if the electric potential is above the disassociation potential of water, and downward otherwise to wash out sediments, for example. Dielectric top and bottom plates 131, 132 having openings for inlet/outlet flow, and inner cylindrical sleeve 133 provide insulation. These insulation elements also have openings to accommodate electrode connections 135, 136, 137, and 138. The device can be energized from top to bottom, or in zones 140, 141, 142 analogous to those discussed above, as two electrode connections 136, 137 contact intermediate plates. In this embodiment the zones can be independently energized, and/or cooperatively energized to give pulsating, varying, reversing, etc. electric field effects. Thus, it will be appreciated that certain salient principles of the invention can be applied to advantage across a variety of geometries. It will also be appreciated that as a treatment stream flows along the elongated pathway it can be subjected to a wide variety of flow and field regimes.

While in the illustrated embodiment the dielectric flow guides 130 are identical, they could instead be different, providing a tight spiral and high velocity and turbulent flow, or a wide loose spiral providing a more languid and laminar flow regime, and these can be placed at different locations within the column configuration 127 or within each zone e.g. 140, 141, 142.

A containment 144 in this embodiment can include a cylindrical portion 145 and top and bottom plates 146, 147, having inlet/outlet openings and fittings conventionally provided, as well as openings for electrode connections 135, 138. Those top and bottom electrode connections can be moved from the top and bottom plates to the side of the containment 16 to contact the edges of the top and bottom plates through the cylindrical sidewall portion as is the case with the connections 136, 137 to intermediate plates between and defining zones 140 and 141 and 141 and 142, respectively.

With this configuration, the electrical properties are different from that of the cylindrical plate embodiments discussed above, but analogous effects can be achieved, for example by bringing the top, 140, middle 141, and bottom 142 zones in the illustrated embodiment to the same or to different potentials, simultaneously or sequentially, or in other words by bringing the respective electrodes connections 135, 136, 137, 138 to the same, or to differing potentials, by turn, and by changing those potentials in a patterned, or even a random, manner.

In one embodiment extra dielectric plates, similar to that shown (e.g. 132) with a hole at the center or at an edge, as appropriate, can be placed in the stack on either side of a zone 140, 141, 142 to electrically isolate that zone. Moreover, by adding additional plates and electrical connections, each zone can have a unique electrode set (anode and cathode) and all can be isolated from each other. This will enable greater differences in potential between zones.

In one embodiment one or more dielectric flow guides, (e.g. 130a in FIG. 16), can be configured so as to have a floor 143 (or ceiling) portion over all or a portion (½ in the illustrated embodiment) of the area of an adjacent metal plate 128 or 129 and holes for fluid flow between plates would also be provided in this floor or ceiling if provided. As will be appreciated where the floor covers all the area it acts as would an additional zone dividing dielectric plate just above described. If it covers half or some other portion, e.g. a pie shape portion, it will act to at least partially electrically shield a portion of the elongated pathway. In this latter embodiment the field is less intense in that portion so shielded, and more intense in the unshielded portion. Accordingly as the treatment stream transits the elongated pathway circling around it is rapidly by turns in shielded and unshielded portions and is thus subjected to a pulsitile field intensity, even when the current is steady-state.

In another embodiment extra dielectric plates 131, 132 and/or floors/ceilings 143 of flow guide members 130, (e.g. 130a in FIG. 16) can be made to have a variable conductivity. For example, in some pie segment, ½, ⅓, etc. the dielectric material can be doped or filed using a conductive material, so that the differential screening from current and electric field is accomplished, though a circular plate, etc. is used. In this case one portion of the plate floor or ceiling will be a dielectric while another part is a conductor, and yet another part can be made a conductor but with higher resistance. In another embodiment one or more of the plates 129, 129 themselves can be made non-sacrificial and/or likewise variable in conductivity in one or more segments.

A provision for gas discharge is made at the outlet, where it is separable from the treatment stream 14. In another embodiment one or more additional out-gas fittings can be provided intermittently along the elongated fluid pathway, i.e. through the cylindrical sidewall 145.

Figure 18:
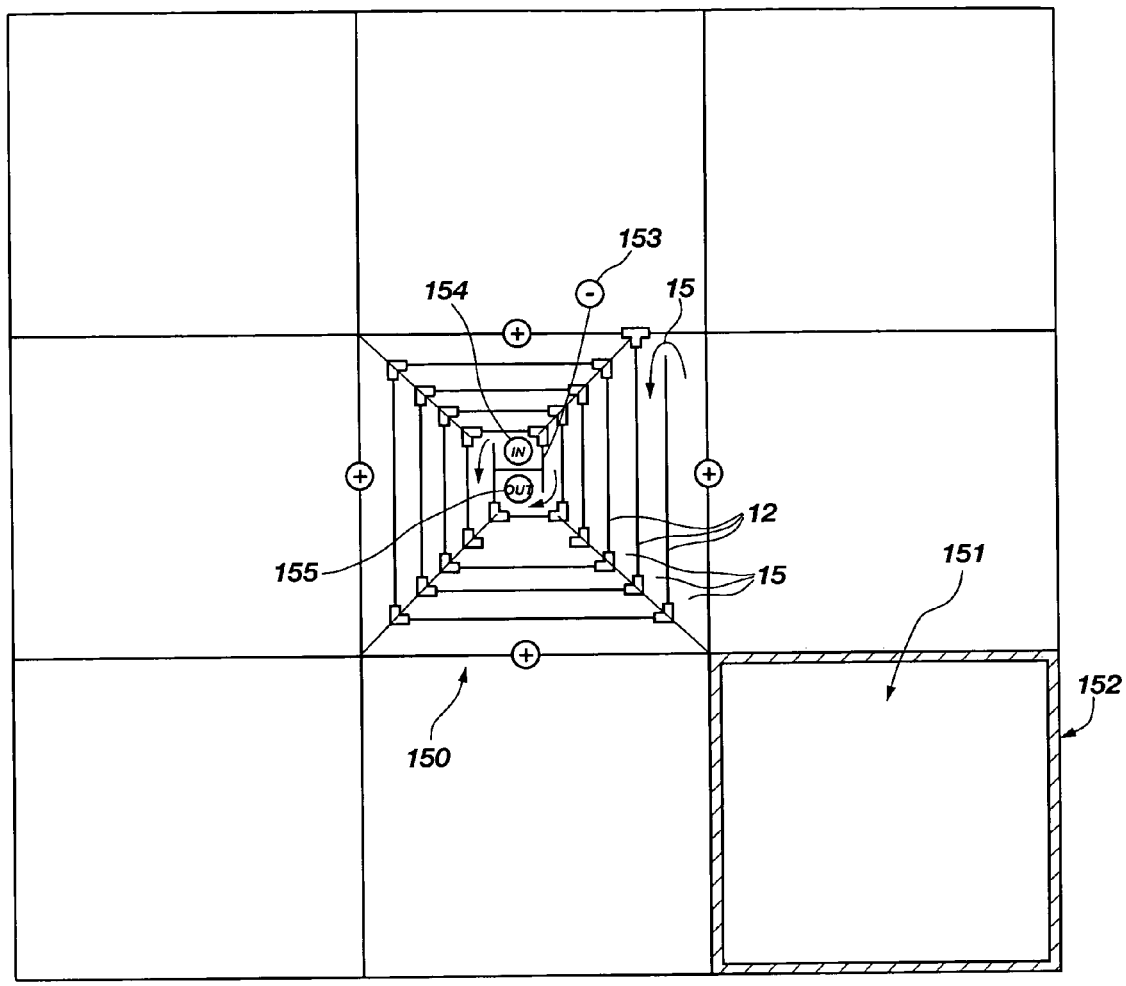
FIG. 18 is a top crossectional schematic representation of an apparatus in accordance with another embodiment of the invention, plate detail being shown in one containment enclosure, and a scheme for modular configuration of 9 such enclosures is shown.

With reference to FIG. 18, it will be appreciated that the invention can be embodied in a square or other rectilinear configuration 150 that can be placed in a rectilinear space 151 within a complimentary containment 152. Flat plates 12 and the containment define an elongated flow path 15. An inner electrode 153 cooperates with the containment 152 to provide cathode and anode functionality by turn, depending on polarity. An inlet 154 and an outlet 155 are provided. In the illustrated embodiment such a system can be packaged modularly, for example nine modules each, of the illustrated configuration 150 can be provided, with manifolding/piped connections below the plane of the figure to run the treatment stream through the modules consecutively, or in parallel, etc. and the electric field in each module can be independently controlled as described above, for example. In one embodiment the cells can be daisy-chained together in a manner analogous to that shown in FIG. 12, so that one controllable power supply (17 in FIG. 1) powers all the cells, in one embodiment switchable between states where different cells are energized, e.g. rows or columns of the nine cell pack being analogous to the three containments of three zones each shown in FIG. 12.

Figure 19A:
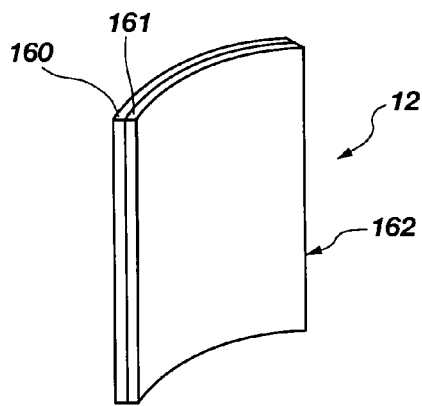
FIG. 19A is a schematic representation of a plate configuration in accordance with one embodiment of the invention.
Figure 19D:
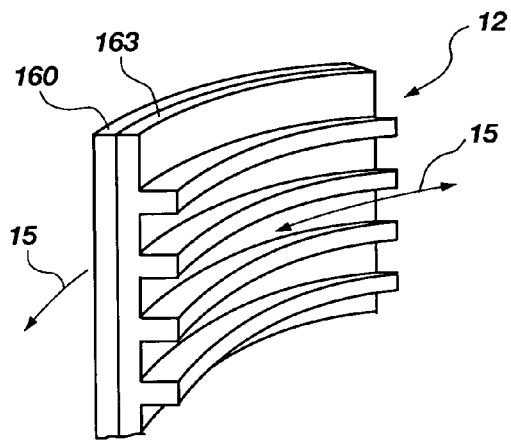
FIG. 19D is a schematic representation, cut away, of a portion of a plate configuration in accordance with one embodiment of the invention.

With reference to FIGS. 19A, B, C, D, E in another embodiment the plates 12 can be configured so as to be layered. For example in FIG. 19A two or more plates 160, 161 of different metals or metal alloys, one metal being primarily sacrificial and the other not, are combined into a layered configuration 162 and formed into a desired shape. The sacrificial layer can be configured so as to have a larger surface area, for example by faceting, scoring, scarifying, etc. In another embodiment one layer can be other than a metal, for example a conductive carbon/resin composite, a metal/polymeric resin composite, or other conductive material. In embodiments shown in FIGS. 19C, D, and E, a sacrificial layer 163 can include a fluted or finned configuration, and the longitudinal direction of the flutes or fins can be parallel with a direction of water flow along the elongated pathway 15. In one embodiment a woven mesh of wires rather than a plate can be used for the sacrificial layer.

It will be appreciated that using this configuration the system can be configured so that two layers 163, 165 of sacrificial material, which can be different from each other, can be placed on each of two sides of the fluid pathway 15, whereby the metals or metal alloys of the cathode and anode are different by turns as the polarity is reversed.

Figure 19B:
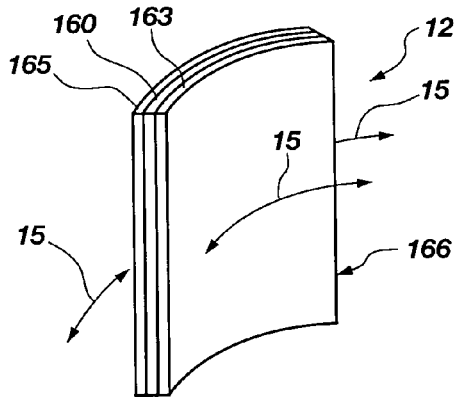
FIG. 19B is a schematic representation of a plate configuration in accordance with one embodiment of the invention.
Figure 19E:
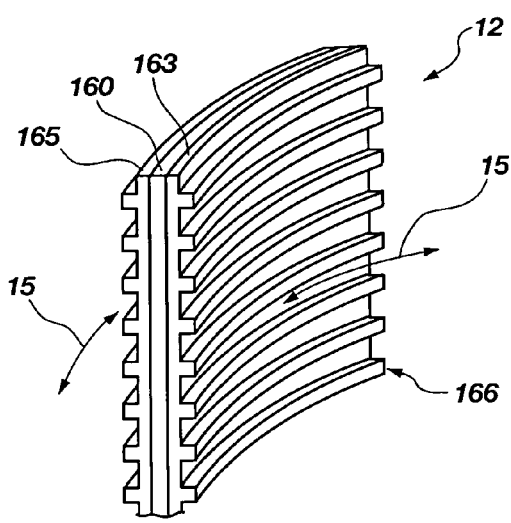
FIG. 19E is a schematic representation, cut away, of a portion of a plate configuration in accordance with one embodiment of the invention.
Figure 19C:
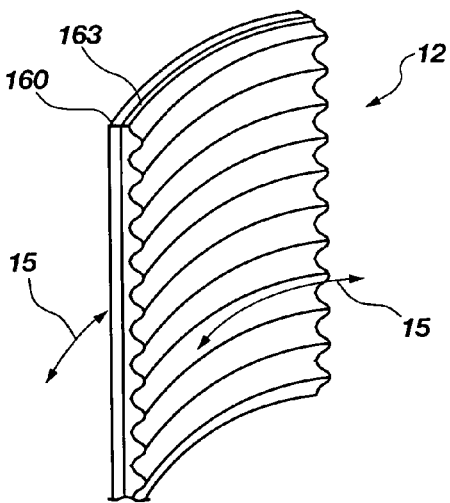
FIG. 19C is a schematic representation of a plate configuration in accordance with one embodiment of the invention.

Also a three-layer configuration of the plates 12, as shown in FIGS. 19B, 19E e.g. a laminated construction 166 with a center layer 160 being more inert can be used. For example a conductive carbon composite or other non sacrificial material can be used as the material of the center layer, sandwiched between two aluminum layers in one embodiment, or two different metals can be used in the outer layers, one on each side.

Figure 20:
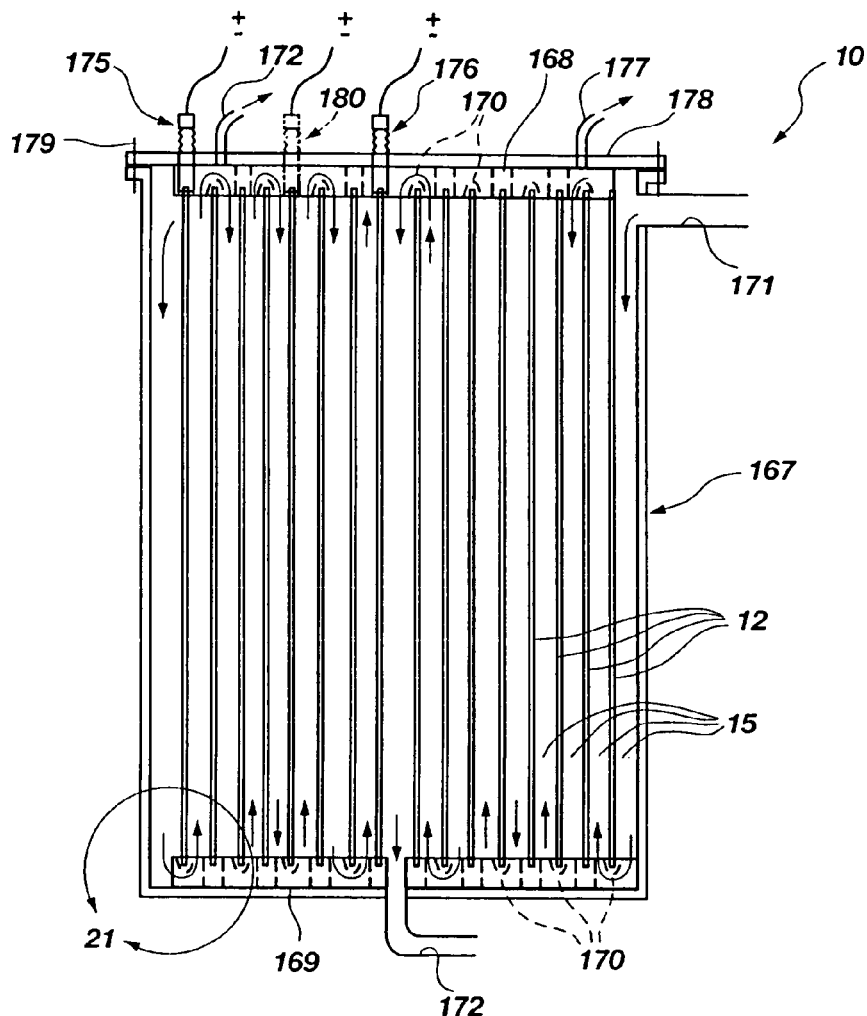
FIG. 20 is a cross-sectional schematic representation, in a side view, of a system in accordance with another embodiment of principles of the invention where the elongated pathway extends vertically up and down in turns between parallel plates; and, FIG. 21 is a more detailed cross-sectional view, taken around line 21 in FIG. 20, of a portion of the apparatus shown in FIG. 20.
Figure 21:
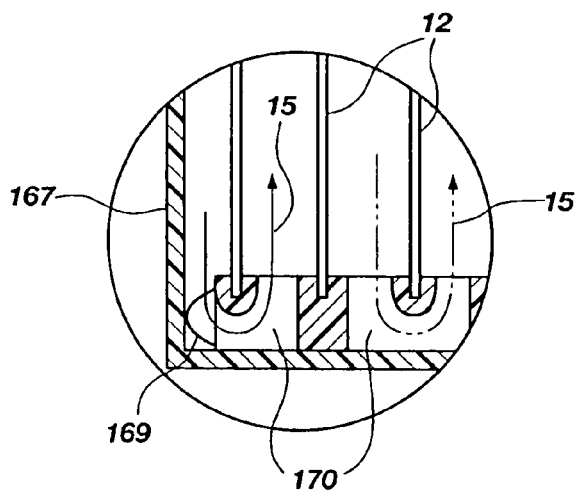

With reference to FIGS. 20 and 21, in another embodiment the system 10 can include an electrocoagulator containment 167 formed of conducting or non-conducting material as described above, and a series of concentric cylindrical plates 12, which can be divided into zones as described above, or be continuous. Top and bottom edges of the plates are captured by top and bottom dielectric plate supports 168, 169. These can be molded from a polymeric resin, and include passages 170 allowing the elongated fluid pathway 15 to bypass the top and bottom, sequentially of the cylindrical plates. This enables a treatment stream to traverse an elongated fluid pathway 15 from an inlet 171 to an outlet 172 by filling the spaces in between the plates and moving up and down in turn to move from the outside to the inside of the concentric configuration. It will be appreciated that the inlet and the outlet can be reversed and the flow directions likewise reversed. Electrode connections 175, 176, and/or others that can be provided if a plurality of zones are provided, can be as described above. Provision for gaseous products of disassociation can be made by one or more off-gas fittings 177. A lid 178 attachable to the rest of the containment 167 by fasteners 179 as described above allows removal of the structure in the containment for maintenance and plate replacement, such as is discussed above. The electrical portions of the system (e.g. 17, 17a in FIG. 1) can be as described above. Another configuration for the zones is to provide them concentrically, for example by providing in another embodiment (shown in outline) an intermediate electrode connection 180, and continuous cylindrical plates, a two zone system can be provided, more zones can be made by adding additional intermediate electrode connections. Again, it will be appreciated that the principles of the invention can be applied in numerous ways using differing geometries.

It will be appreciated in light of the foregoing that a system 10 in accordance with the invention can provide advantages in efficiency and adaptability to changing wastewater treatment streams. These advantages can coexist with compact size and less frequent maintenance, and the system can be sized up or down as required and the pulsing timing can be configured to provide good treatment results using less power.

It is to be understood that the above-referenced arrangements are only illustrative of the application for the principles of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. An electrocoagulation system configured for treating a treatment stream, comprising:
   a container having an inlet and an outlet;
   a plurality of plates positioned in the container to at least partially define a pathway from the inlet of the container to the outlet of the container through which the treatment stream passes, the plurality of plates forming at least two sets of electrodes;
   a power supply configured to provide electric potential to the plurality of plates, wherein the polarity of each of the at least two sets of electrodes is controllable independently from each other; and
   wherein the electrocoagulation system is configured so that as the treatment stream moves along the pathway the treatment stream is subjected to a plurality of electric field regimes which plurality of electric field regimes includes a non-constant current density when operated under steady-state operation.

2. An electrocoagulation system as set forth in claim 1, wherein the treatment stream passes though a plurality of zones each of which includes an electric field regime from the plurality of electric field regimes, wherein the electric field regime in each of the plurality of zones is controllable independently of each other.

3. An electrocoagulation system as set forth in claim 2, wherein the power supply is configured to output substantially constant power divided between the plurality of zones, and wherein a portion of power sent to each of the plurality of zones is changeable so that the electric field regime in each zone is variable while the power provided by the power supply remains substantially constant.

4. An electrocoagulation system as set forth in claim 1, wherein at least one of the plurality of electric field regimes is pulsable.

5. An electrocoagulation system as set forth in claim 1, further comprising a fluid connection positioned between the inlet of the container and the outlet of the container and though which substances can be injected into and withdrawn from the treatment stream.

6. An electrocoagulation system as set forth in claim 1, wherein the pathway winds out from a central portion of the container to an outer portion of the container.

7. An electrocoagulation system as set forth in claim 6, wherein the pathway has a spiraling configuration.

8. An electrocoagulation system as set forth in claim 7, wherein the spiraling configuration is rounded.

9. An electrocoagulation system as set forth in claim 6, wherein the pathway winds back from the outer portion of the container to the central portion of the container.

10. An electrocoagulation system as set forth in claim 1, further comprising a power storage device that provides electric potential to the plurality of plates.

11. An electrocoagulation system as set forth in claim 10, wherein the power storage device comprises a capacitor.

12. An electrocoagulation system as set forth in claim 1, wherein a cross-sectional area of the pathway along its length is not constant, and wherein the pathway has at least one abrupt change in direction to enhance variation of the flow of the treatment stream as it passes through the container.

13. An electrocoagulation system as set forth in claim 1, wherein the plurality of plates form at least three sets of electrodes.

14. An electrocoagulation system as set forth in claim 13, wherein the power supply further comprises a plurality of switches so that current from the power supply to the at least three sets of electrodes is switchable, wherein the power supply is configured operate at a substantially steady state and the current output to the at least three sets of electrodes is variable.

15. An electrocoagulation system configured for remediation of a wastewater treatment stream, comprising:
   a container having an inlet and an outlet;
   a plurality of electrically conductive plates, at least one of which is sacrificial, the plurality of electrically conductive plates defining a pathway from the inlet of the container to the outlet of the container through which the wastewater treatment stream passes; and
   a power supply configured to provide variable and reversible electric potential to the plurality of electrically conductive plates, wherein at least two of the plurality of electrically conductive plates are configured to reversibly act as both a cathode and an anode so that the wastewater treatment stream is subject to a plurality of electric field regimes having a reversible polarity and a non-constant current density under steady state operation as it flows along the pathway; and
   wherein a cross-sectional area of the pathway along its length is not constant so that the wastewater treatment stream is subjected to a variety of fluid flow regimes as it flows along the pathway.

16. A system as set forth in claim 15, wherein the plates are configured in a spiraling pattern.

17. A system as set forth in claim 16, wherein the spiraling pattern is rounded.

18. A system as set forth in claim 15, further comprising a connection positioned between the inlet of the container and the outlet of the container and through which substances can be injected into and withdrawn from the wastewater treatment stream.

19. A system as set forth in claim 15, further comprising a connection facilitating separation of gasses from the treatment stream.

20. A system as set forth in claim 15, wherein the pathway directs the wastewater treatment stream through at least one of the electric field regimes from the plurality of electric field regimes in two different directions.

21. A system as set forth in claim 16, wherein the pathway has a spiral shape which reverses on itself.

22. A system as set forth in claim 15, wherein the power supply is configured so that power can be turned on to at least a portion of the plurality of electrically conductive plates while separately turned off to another portion of the plurality of electrically conductive plates.

23. A system as set forth in claim 22, wherein the power supply is configured so that a polarity of the electric potential to at least one portion of the plurality of electrically conductive plates is reversible while a polarity of the electric potential to at least another portion of the plurality of electrically conductive plates remains constant.

24. A system as set forth in claim 23, wherein the system is configured so that the magnitude of at least one of a current and a voltage of the electric potential is changeable from one non-zero value to another non-zero value in at least a portion of the plurality of electrically conductive plates.

25. A system as set forth in claim 15, wherein the system is configured to pulse the intensity of at least one of the plurality of electric field regimes.

26. A system as set forth in claim 15, wherein the plates are isolated into a plurality of zones, wherein at least one of the plurality of zones includes at least one of the plurality of electric field regimes, and wherein at least one of the plurality of zones is energized at a power level different from a power level in another of the plurality of zones.

27. A system as set forth in claim 26, wherein the plurality of zones includes two, three, or four zones.

28. A system as set forth in claim 15, comprising a plurality of containers each of which is configured as recited in claim 15, the plurality of containers being powered by a single power supply.

29. A system as set forth in claim 27, wherein the system further comprises switches enabling power to be switched from one of the plurality of zones to another one of the plurality of zones.

30. A system as set forth in claim 29, where said switches are configured in an H-bridge configuration.

31. A system as set forth in claim 29, wherein said switches are solid state devices.

32. A system as set forth in claim 29, wherein said switches can control supplied electrical current as to being on and off and as to polarity of said current in at least a portion of said plates.

33. A system as set forth in claim 15, wherein at least two plates from the plurality of electrically conductive plates are powered by the power supply and at least two plates from the plurality of electrically conductive plates are powered by way of an electrolytic property of the treatment stream.

34. A system as set forth in claim 33, comprising a plurality of zones, and wherein the at least two plates powered by the power supply are in one zone from the plurality of zones and the at least two plates powered by way of the treatment stream are in another zone from the plurality of zones.

35. An electrocoagulation system configured to enable remediation of variable wastewater treatment streams, comprising:
    a container configured for containing a treatment stream under a pressure different from atmospheric pressure, the container having an inlet and an outlet;
    a plurality of sources of distributed potential, at least one being configured to be able to act as a cathode and at least one being configured to be able to act as an anode;
    a controllable switching power supply configured to be able to provide power so as to provide a variable electric field and a non-constant current density to the treatment stream within the container, and wherein a polarity of at least one of the plurality of sources of distributed potential is controllably reversible from a polarity of another of the plurality of sources;
    an elongated fluid pathway disposed within the confinement and extending from the inlet to the outlet, the elongated fluid pathway being in fluid contact with said sources of electrical potential along a majority of its length and being of non-constant cross-sectional area and having at least one abrupt change in cross-sectional area and at least one abrupt flow direction change; and
    wherein the wastewater treatment streams traveling along the elongated pathway are subjected to a multiplicity of electrical field and fluid flow regimes, including the non-constant current density.

36. An electrocoagulation system configured to provide improved adaptability in treating variations in a wastewater treatment stream, comprising:
    a container having an inlet and an outlet and an elongated fluid pathway from the inlet to the outlet;
    means for providing distributed potential and an electric field in the treatment stream along a majority of the elongated fluid pathway;
    means for controllably altering a polarity of the electric field along the elongated fluid pathway, whereby the treatment stream is subjected to a multiplicity of electric field regimes having a non-constant current density and a different polarity as it transits the elongated fluid pathway; and
    means for providing a plurality of fluid flow regimes which the treatment stream is subjected to as it transits the elongated fluid pathway.

37. A system as set forth in claim 1, further comprising a central manifold, and wherein the elongated fluid treatment pathway extends from at least one of a) a central portion within the container to an outer portion of the container; and, b) said outer portion to said central portion.

38. A system as set forth in claim 36, further comprising a central manifold, and wherein the elongated fluid treatment pathway extends from at least one of a) a central portion within the container to an outer portion of the container; and, b) said outer portion to said central portion.

39. An electrocoagulation system comprising:
    a container having an inlet and an outlet;
    a plurality of electrically-isolated zones corresponding with a plurality of electric fields, wherein each of the plurality of electrically-isolated zones includes at least one of the plurality of electric fields, wherein the power level of each of the plurality of electric fields is controllable independently of the power level of the other electric fields so as to produce a non-constant current density among the plurality of electric fields, and further wherein the polarity of each of the plurality of electric fields is controllable independently of the polarity of the other electric fields; and
    wherein the container is configured to direct a treatment stream through the plurality of electrically-isolated zones to facilitate removal of impurities from the treatment stream.

40. An electrocoagulation system comprising:
    a container having an inlet and an outlet;
    wherein the container is configured so that a treatment stream enters the container at the inlet, travels through the container, and exits at the outlet;
    wherein the treatment stream spirals around a center of the container as the treatment stream moves through the container; and
    wherein the electrocoagulation system is configured to subject the treatment stream to an electric field having a non-constant current density as the treatment stream passes through the container to facilitate removal of impurities from the treatment stream.

41. A system as set forth in claim 1, wherein the plurality of plates forming the at least two sets of electrodes have a non-constant surface area, and wherein the non-constant current density is a result the non-constant surface area of the at least two set of electrodes.

42. A system as set forth in claim 15, wherein the non-constant current density is a result of a non-constant surface area of the plurality of electrically conductive plates defining the pathway though which the wastewater treatment stream passes.

43. A system as set forth in claim 1, further comprising one or more flow guide members along the pathway which at least partially electrically shield a portion of the pathway and contribute to forming the plurality of electric field regimes, said flow guide members being a dielectric or a conductor having a higher resistance than the plurality of plates.

44. A system as set forth in claim 15, further comprising one or more flow guide members along the pathway which at least partially electrically shield a portion of the pathway and contribute to forming the plurality of electric field regimes, said flow guide members being a dielectric or a conductor having a higher resistance than the plurality of plates.

45. A system as set forth in claim 35, further comprising one or more flow guide members along the elongated fluid pathway which at least partially electrically shield a portion of the pathway and contribute to forming the multiplicity of electric field and flow regimes, said flow guide members being a dielectric or a conductor having a higher resistance than the plurality of plates.

46. A system as set forth in claim 36, further comprising one or more flow guide members along the elongated fluid pathway which at least partially electrically shield a portion of the pathway and subjecting the treatment stream to a pulsitile field intensity, said flow guide members being a dielectric or a conductor having a higher resistance than the plurality of plates.

47. A system as set forth in claim 40, further comprising one or more flow guide members along a pathway of the treatment stream which at least partially electrically shield a portion of the pathway and contribute to the non-constant current density, said flow guide members being a dielectric or a conductor having a higher resistance than the plurality of plates.

* * * * *